(12) United States Patent
Yamano et al.

(10) Patent No.: US 7,920,145 B2
(45) Date of Patent: Apr. 5, 2011

(54) IMAGE PROCESSING APPARATUS CONTROL METHOD AND IMAGE PROCESSING APPARATUS

(75) Inventors: Akira Yamano, Hino (JP); Masayuki Nakazawa, Hachioji (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 988 days.

(21) Appl. No.: 11/804,951

(22) Filed: May 21, 2007

(65) Prior Publication Data

US 2007/0274586 A1   Nov. 29, 2007

(30) Foreign Application Priority Data

May 26, 2006   (JP) ................................ 2006-146866

(51) Int. Cl.
*G09G 5/02* (2006.01)
(52) U.S. Cl. ........................................................ 345/589
(58) Field of Classification Search .................... 345/589
See application file for complete search history.

(56) References Cited

FOREIGN PATENT DOCUMENTS

| JP | 2000-330530 A | | 11/2000 |
|---|---|---|---|
| JP | 2001-34232 | * | 2/2001 |
| JP | 2001-34232 A | | 2/2001 |
| JP | 2003-50566 A | | 2/2003 |

* cited by examiner

*Primary Examiner* — Ryan R Yang
(74) *Attorney, Agent, or Firm* — Holtz, Holtz, Goodman & Chick, PC

(57) ABSTRACT

There is described an image processing apparatus that converts (n+m)-bit monochromatic image data of a single channel into n-bit color display image data of three channels or more, based on predetermined correlations. The apparatus includes luminance and chromaticity calculating sections to calculate luminance and chromaticity information corresponding to each of monochrome signal values; a signal value determining section to determine each combination of plural-channel color signal values represented by the n-bit color display image data, based on the luminance and chromaticity information, so that each combination of the plural-channel color signal values corresponds to each of the monochrome signal values; and a correlation establishing section to establish the predetermined correlations between the (n+m)-bit monochromatic image data and the n-bit color display image data, so that each combination of the plural-channel color signal values and each of the monochrome signal values are correlated with each other.

12 Claims, 15 Drawing Sheets

FIG. 4

| No. | R | G | B |
|---|---|---|---|
| 1 | -2 | -1 | 2 |
| 2 | -2 | 0 | 1 |
| 3 | -2 | 1 | 0 |
| 4 | -2 | 2 | -1 |
| 5 | -1 | -2 | 2 |
| 6 | -1 | -1 | 1 |
| 7 | -1 | 0 | 0 |
| 8 | -1 | 1 | -1 |
| 9 | -1 | 2 | -2 |
| 10 | 0 | -2 | 1 |
| 11 | 0 | -1 | 0 |
| 12 | 0 | 0 | -1 |
| 13 | 0 | 1 | -2 |
| 14 | 1 | -2 | 0 |
| 15 | 1 | -1 | -1 |
| 16 | 1 | 0 | -2 |
| 17 | 2 | -2 | -1 |
| 18 | 2 | -1 | -2 |
| 19 | -2 | 0 | 2 |
| 20 | -2 | 1 | 1 |
| 21 | -2 | 2 | 0 |
| 22 | -1 | -1 | 2 |
| 23 | -1 | 0 | 1 |
| 24 | -1 | 1 | 0 |
| 25 | -1 | 2 | -1 |
| 26 | 0 | -2 | 2 |
| 27 | 0 | -1 | 1 |
| 28 | 0 | 0 | 0 |

| No. | R | G | B |
|---|---|---|---|
| 29 | 0 | 1 | -1 |
| 30 | 0 | 2 | -2 |
| 31 | 1 | -2 | 1 |
| 32 | 1 | -1 | 0 |
| 33 | 1 | 0 | -1 |
| 34 | 1 | 1 | -2 |
| 35 | 2 | -2 | 0 |
| 36 | 2 | -1 | -1 |
| 37 | 2 | 0 | -2 |
| 38 | -2 | 1 | 2 |
| 39 | -2 | 2 | 1 |
| 40 | -1 | 0 | 2 |
| 41 | -1 | 1 | 1 |
| 42 | -1 | 2 | 0 |
| 43 | 0 | -1 | 2 |
| 44 | 0 | 0 | 1 |
| 45 | 0 | 1 | 0 |
| 46 | 0 | 2 | -1 |
| 47 | 1 | -2 | 2 |
| 48 | 1 | -1 | 1 |
| 49 | 1 | 0 | 0 |
| 50 | 1 | 1 | -1 |
| 51 | 1 | 2 | -2 |
| 52 | 2 | -2 | 1 |
| 53 | 2 | -1 | 0 |
| 54 | 2 | 0 | -1 |
| 55 | 2 | 1 | -2 |

TABLE A

| INTERNAL SIGNAL VALUE | TEST PATTERN SIGNAL VALUE | | | MEASURED BRIGHTNESS |
|---|---|---|---|---|
| | R | G | B | Y |
| 0 | 0 | 0 | 0 | Ymin |
| 273 | 17 | 17 | 17 | ⋮ |
| 546 | 34 | 34 | 34 | ⋮ |
| 819 | 51 | 51 | 51 | ⋮ |
| 1092 | 68 | 68 | 68 | ⋮ |
| 1365 | 85 | 85 | 85 | ⋮ |
| 1638 | 102 | 102 | 102 | ⋮ |
| 1911 | 119 | 119 | 119 | ⋮ |
| 2184 | 136 | 136 | 136 | ⋮ |
| 2457 | 153 | 153 | 153 | ⋮ |
| 2730 | 170 | 170 | 170 | ⋮ |
| 3003 | 187 | 187 | 187 | ⋮ |
| 3276 | 204 | 204 | 204 | ⋮ |
| 3549 | 221 | 221 | 221 | ⋮ |
| 3822 | 238 | 238 | 238 | ⋮ |
| 4095 | 255 | 255 | 255 | Ymax |

TABLE B

| INTERNAL SIGNAL VALUE | ESTIMATED MEASURED BRIGHTNESS |
|---|---|
| | Y |
| 0 | Ymin |
| 1 | ⋮ |
| 2 | ⋮ |
| 3 | ⋮ |
| 4 | ⋮ |
| ⋮ | ⋮ |
| 2045 | ⋮ |
| 2046 | ⋮ |
| 2047 | ⋮ |
| 2048 | ⋮ |
| ⋮ | ⋮ |
| 4091 | ⋮ |
| 4092 | ⋮ |
| 4093 | ⋮ |
| 4094 | ⋮ |
| 4095 | Ymax |

|  | R | G | B |
|---|---|---|---|
| 0 | 0 | 0 | 0 |
| 1 | 0 | 0 | 0 |
| 2 | 0 | 0 | 0 |
| ⋮ | ⋮ | ⋮ | ⋮ |
| 256 | 64 | 64 | 64 |
| 257 | 64 | 64 | 64 |
| 258 | 64 | 64 | 64 |
| ⋮ | ⋮ | ⋮ | ⋮ |
| 512 | 128 | 128 | 128 |
| 513 | 128 | 128 | 128 |
| 514 | 128 | 128 | 128 |
| ⋮ | ⋮ | ⋮ | ⋮ |
| 1021 | 255 | 255 | 255 |
| 1022 | 255 | 255 | 255 |
| 1023 | 255 | 255 | 255 |

IMAGE PROCESSING APPARATUS CONTROL METHOD AND IMAGE PROCESSING APPARATUS

This application is based on Japanese Patent Application NO. 2006-146866 filed on May 26, 2006 with Japan Patent Office, the entire content of which is hereby incorporated by reference.

BACKGROUND OF THE INVENTION

The present invention relates to an image processing apparatus control method and an image processing apparatus and more particularly to an image processing apparatus control method and an image processing apparatus for displaying on a color display a monochromatic image having grayscales larger in number than the drive grayscales of the image display means.

A diagnostic image picked up by a medical diagnostic apparatus such as an X-ray diagnostic apparatus, an MRI (magnetic resonance imaging) diagnostic apparatus, or various CT (computed tomography) apparatuses is generally recorded on a light transmissible image recording film such as an X-ray film or other film photosensitive materials and is reproduced as a light transmissible image. The film on which the diagnostic image is reproduced is set in an observation apparatus called a viewing box, is observed in a state that light is irradiated from the rear thereof, and is diagnosed of existence of a lesion.

Further, to various medical diagnostic and measuring apparatuses, as a monitor for observing a picked-up and measured image, a color display such as a CRT (cathode ray tube) display or an LCD (liquid crystal display) is connected and by images outputted to these display screens, a diagnosis, confirmation and adjustment of a diagnostic image before outputted to the film, and an image process are performed.

Meanwhile, when reproducing the image picked up by the aforementioned X-ray diagnostic apparatus on a film, generally, a blue-based monochromatic film is used often. Further, generally, an image is reproduced often by a grayscale resolution 10 to 12 bits long (1024 to 4096 grayscales).

Therefore, also when diagnosing an image on a display such as a CRT or an LCD, an exclusive monochromatic display having a grayscale resolution more than 10 bits long is used often.

On the other hands, to display a color image by an endoscope or an eyeground camera, a color display is used. Further, in recent years, also when displaying a three-dimensional image by an ultrasound diagnostic apparatus, a CT apparatus, or an MRI apparatus, a color display has been used.

To make a synthetic diagnosis, it is necessary to observe images of a plurality of kinds of diagnostic apparatuses and for that purpose, both exclusive high-grayscale monochromatic and color displays must be installed and a problem arises that it is expensive and a wide installation space is required.

A color display can display a monochromatic (black and white) image, though on the color display, an image is displayed generally at an 8-bit grayscale resolution, so that when reproducing an image on an ordinary display screen, an image is displayed by the so-called bit-down image data having a lower grayscale resolution than that of an image picked-up and outputted by the aforementioned X-ray diagnostic apparatus.

Concretely, for example, to convert 10-bit monochromatic image data to 8-bit R, G, and B image data, a monochromatic image signal value of 1024 grayscales, on the basis of an LUT (look up table) as shown in FIG. 19, is converted to R, G, and B values of 256 grayscales. Here, in the conventional LUT, the R, G, and B values are all equivalent and a problem arises that the R, G, and B image data cannot display an image of grayscales more than 256 grayscales.

Furthermore, as in the invention described in Patent Document 1, an image display apparatus for making the B value in the LUT larger than the R and G values, thereby reproducing a blue-based monochromatic film is known. According to such an image display apparatus, an LUT is prepared under the condition of R value=G value=K×B value (0<K<1), thus the color tone of the blue-based monochromatic film can be reproduced almost, though the maximum values of the R and G values become smaller than 256, so that the number of displayable grayscales becomes smaller than 256, thus when reproducing the color tone of the blue-based monochromatic film, the reduction in the number of grayscales is a bigger problem.

As a method for displaying grayscales more than the number of drive grayscales of the display, a method of FRC (frame rate control) display is devised.

Here, the FRC display means that when displaying image data having a high grayscale resolution (the number of bits) as image data having a low grayscale resolution (the number of bits), from the image data having a large number of bits, image data having a small number of bits which is the number of bits in accordance with the difference in the number of bits between both image data is prepared, and the image data is displayed sequentially, thus a grayscale equivalent to the large number of bits is represented by image display of the small number of bits.

Concretely, assuming the difference in the number of bits as n, image data of a small number of bits of the number of frames $2^n$ is prepared, and the image data of the small number of bits is displayed sequentially, thus for example, using 4 frames of images of an 8-bit grayscale resolution, a grayscale equivalent to a 10-bit grayscale resolution is represented.

Further, as in the invention described in Patent Document 2, an LUT is prepared so that not only the R, G, and B values are equivalent but also as shown in Table 1 of Patent Document 2, the R, G, and B values are not reduced monotonously and the total of the R, G, and B values is changed one by one, thus an image of 765 grayscales can be displayed.

Furthermore, as in the invention described in Patent Document 3, an image display apparatus for representing a multi-grayscale using an LUT for changing a sub-pixel signal value within an optional range is known. According to such an image display, theoretically, an image of 4096 or more grayscales can be displayed.

[Patent Document 1]
Tokkai 2000-330530, Japanese Non-Examined Patent Publication
[Patent Document 2]
Tokkai 2001-034232, Japanese Non-Examined Patent Publication
[Patent Document 3]
Tokkai 2003-050566, Japanese Non-Examined Patent Publication However, in the FRC display, a problem arises that image flickering which is called the so-called flicker is conspicuous and the eyes are made tired and another problem arises that the burden imposed on the process required to change the divided display data in the FRC representation is great.

Further, in the image display apparatus described in Patent Document 2, the maximum value of an input monochromatic image signal value is converted to the "maximum value of R+maximum value of G+maximum value of B", and the R, G, and B signal values are divided and distributed almost evenly, and the restriction to the combination of the R, G, and B values is strict, so that unless the FRC display is performed, only an image of 766 grayscales is represented, thus the image display apparatus is insufficient to a simple pick-up image diagnosis.

Furthermore, in the image display apparatus described in Patent Document 3, a multi-grayscale display on a monochromatic monitor is supposed, so that the selectable range of a sub-pixel signal value is excessively large and the sub-pixel signal value is selected only under the condition concerning luminance, thus even if a monochromatic image is displayed on a color monitor using a prepared LUT, a problem arises that it cannot be displayed with a color tone suited to diagnosis. Further, it is described that the image display apparatus described in Patent Document 3 can be applied also to the color monitor, though in that case, the pixels of R, G, and B must be divided furthermore into sub-pixels and a problem arises that the constitution is complicated.

SUMMARY OF THE INVENTION

To overcome the abovementioned drawbacks in conventional image processing apparatus, it is one of objects of the present invention to provide an image processing apparatus control method and an image processing apparatus, which makes it possible not only to display a monochromatic image, having an appropriate color tone, on a color display, but also to represent a multi-grayscale image having a number of gradations, which is equal to or greater than four times of the number of drive grayscales of the color display, without employing the FRC display mode.

Accordingly, at least one of abovementioned objects of the present invention can be attained by the control methods to be employed in image processing apparatus and the image processing apparatuses, described as follows.

(1) According to a control method reflecting an aspect of the present invention, the control method, to be employed in an image processing apparatus, for converting (n+m)-bit monochromatic image data represented by a single channel into n-bit color display image data represented by three channels or more channels, based on predetermined correlations between the (n+m)-bit monochromatic image data and the n-bit color display image data, wherein numeral "n" indicates a positive integer equal to or greater than 8, while numeral "m" indicates a positive integer equal to or greater than 2, the control method comprises: acquiring luminance information corresponding to each of monochrome signal values represented by the (n+m)-bit monochromatic image data; acquiring chromaticity information corresponding to each of the monochrome signal values represented by the (n+m)-bit monochromatic image data; determining each combination of plural-channel color signal values represented by the n-bit color display image data, based on the luminance information and the chromaticity information, so that each combination of the plural-channel color signal values corresponds to each of the monochrome signal values; and establishing the predetermined correlations between the (n+m)-bit monochromatic image data and the n-bit color display image data, so that each combination of the plural-channel color signal values and each of the monochrome signal values are correlated with each other.

(2) According to another aspect of the present invention, the control method recited in item 1, further comprises: selecting a plurality of candidate color display image data having signal values different from each other, with respect to each of the monochrome signal values represented by the (n+m)-bit monochromatic image data; and calculating a luminance and a chromaticity with respect to each of the plurality of candidate color display image data; wherein the step of acquiring luminance information includes: a luminance determining process for determining a target luminance corresponding to each of the monochrome signal values represented by the (n+m)-bit monochromatic image data; and the step of acquiring chromaticity information includes: a chromaticity determining process for determining a target chromaticity corresponding to each of the monochrome signal values represented by the (n+m)-bit monochromatic image data; and wherein, in the determining step, signal values of color display image data are determined, based on a contrast between each luminance of the plurality of candidate color display image data calculated in the calculating step and the target luminance, and another contrast between each chromaticity of the plurality of candidate color display image data calculated in the calculating step and the target chromaticity.

(3) According to still another aspect of the present invention, in the control method recited in item 2, the determining step includes: a luminance selection process for selecting a plurality of primary-candidate color display image data, based on the contrast between each luminance of the plurality of candidate color display image data and the target luminance; and a chromaticity selection process for determining signal values of the specific color display image data, based on a contrast between each chromaticity of the plurality of primary-candidate color display image data and the target chromaticity.

(4) According to still another aspect of the present invention, in the control method recited in item 3, in the chromaticity determining process, a target chromaticity, corresponding to a certain monochrome signal value of the (n+m)-bit monochromatic image data, is set at a chromaticity, determined in the determining step and corresponding to another monochrome signal value of the (n+m)-bit monochromatic image data; and, in the chromaticity selection process, signal values of color display image data are determined, based on a contrast between the chromaticity calculated in the calculating step, with respect to each of the primary-candidate color display image data corresponding to a certain monochrome signal value of the (n+m)-bit monochromatic image data, and the target chromaticity.

(5) According to still another aspect of the present invention, in the control method recited in item 4, in the chromaticity determining process, the target chromaticity, corresponding to signal value "i" ("i" indicates a positive integer being equal to or greater than 1 and equal to or smaller than $(2^{n+m}-1)$) of the (n+m)-bit monochromatic image data, is employed as a chromaticity of color display image data, which corresponds to (n+m)-bit monochromatic image data of signal value (i−1); and in the chromaticity selection process, signal values of primary-candidate color display image data, which have such a chromaticity that is calculated in the calculating step and makes a color-difference with the target chromaticity minimum, is selected from the plurality of primary-candidate color display image data corresponding to the (n+m)-bit monochromatic image data of the signal value "i".

(6) According to still another aspect of the present invention, in the control method recited in item 4, in the chromaticity determining process, the target chromaticity, corresponding to signal value "i" ("i" indicates a positive integer being equal to or greater than 2 and equal to or smaller than ($2^{n+m}-1$)) of the (n+m)-bit monochromatic image data, is employed as a chromaticity of color display image data, which corresponds to (n+m)-bit monochromatic image data of signal value (i−1) and another chromaticity of the color display image data, which corresponds to (n+m)-bit monochromatic image data of signal value (i−2); and, in the chromaticity selection process, primary-candidate color display image data, which have such a chromaticity that is calculated in the calculating step and makes an absolute difference value between color-difference ΔE(i−1) and color-difference ΔE(i−2) maximum, is selected from the plurality of primary-candidate color display image data corresponding to the (n+m)-bit monochromatic image data of the signal value "i"; and the color-difference ΔE(i−1) is defined as a color-difference with color display image data, which corresponds to (n+m)-bit monochromatic image data of signal value (i−1), while, the color-difference ΔE(i−2) is defined as a color-difference with color display image data, which corresponds to (n+m)-bit monochromatic image data of signal value (i−2).

(7) According to still another aspect of the present invention, in the control method recited in item 2, the determining step includes: a chromaticity selection process for selecting a plurality of primary-candidate color display image data, based on a contrast between each chromaticity of the plurality of candidate color display image data calculated in the calculating step and the target chromaticity; and a luminance selection process for determining a signal value of color display image data, based on a contrast between each luminance of the plurality of primary-candidate color display image data and the target luminance.

(8) According to an image processing apparatus reflecting still another aspect of the present invention, the image processing apparatus that converts (n+m)-bit monochromatic image data represented by a single channel into n-bit color display image data represented by three channels or more channels, based on predetermined correlations between the (n+m)-bit monochromatic image data and the n-bit color display image data, wherein numeral "n" indicates a positive integer equal to or greater than 8, while numeral "m" indicates a positive integer equal to or greater than 2, the image processing apparatus comprises: a luminance calculating section to calculate luminance information corresponding to each of monochrome signal values represented by the (n+m)-bit monochromatic image data; a chromaticity calculating section to calculate chromaticity information corresponding to each of the monochrome signal values represented by the (n+m)-bit monochromatic image data; a signal value determining section to determine each combination of plural-channel color signal values represented by the n-bit color display image data, based on the luminance information and the chromaticity information, so that each combination of the plural-channel color signal values corresponds to each of the monochrome signal values; and a correlation establishing section to establish the predetermined correlations between the (n+m)-bit monochromatic image data and the n-bit color display image data, so that each combination of the plural-channel color signal values and each of the monochrome signal values are correlated with each other.

(9) According to still another aspect of the present invention, the image processing apparatus recited in item 8, further comprises: a candidate-data selecting section to select a plurality of candidate color display image data having signal values different from each other, with respect to each of the monochrome signal values represented by the (n+m)-bit monochromatic image data; a target luminance determining section to determine a target luminance corresponding to each of the monochrome signal values represented by the (n+m)-bit monochromatic image data; and a target chromaticity determining section to determine a target chromaticity corresponding to each of the monochrome signal values represented by the (n+m)-bit monochromatic image data; wherein the luminance calculating section calculates a luminance with respect to each of the plurality of candidate color display image data, and the chromaticity calculating section calculates a chromaticity with respect to each of the plurality of candidate color display image data; and wherein the signal value determining section selects specific color display image data, based on a contrast between each luminance of the plurality of candidate color display image data and the target luminance, and another contrast between each chromaticity of the plurality of candidate color display image data and the target chromaticity.

(10) According to still another aspect of the present invention, in the image processing apparatus recited in item 9, the signal value determining section includes: a luminance selection unit to selects a plurality of primary-candidate color display image data, based on the contrast between each luminance of the plurality of candidate color display image data and the target luminance; and a chromaticity selection unit to determine signal values of the specific color display image data, based on a contrast between each chromaticity of the plurality of primary-candidate color display image data and the target chromaticity.

(11) According to still another aspect of the present invention, in the image processing apparatus recited in item 10, the target chromaticity determining section sets a target chromaticity, corresponding to a certain monochrome signal value of the (n+m)-bit monochromatic image data, at a chromaticity, determined by the signal value determining section and corresponding to another monochrome signal value of the (n+m)-bit monochromatic image data; and the chromaticity selection unit determines signal values of the specific color display image data, based on a contrast between the chromaticity, with respect to each of the primary-candidate color display image data corresponding to a certain monochrome signal value of the (n+m)-bit monochromatic image data, and the target chromaticity.

(12) According to still another aspect of the present invention, in the image processing apparatus recited in item 11, the target chromaticity determining section employs the target chromaticity, corresponding to signal value "i" ("i" indicates a positive integer being equal to or greater than 1 and equal to or smaller than ($2^{n+m}-1$)) of the (n+m)-bit monochromatic image data, as a chromaticity of color display image data, which corresponds to (n+m)-bit monochromatic image data of signal value (i−1); and the chromaticity selection unit selects signal values of primary-candidate color display image data, which have such a chromaticity that makes a color-difference with the target chromaticity minimum, from the plurality of primary-candidate color display image data corresponding to the (n+m)-bit monochromatic image data of the signal value "i".

(13) According to still another aspect of the present invention, in the image processing apparatus recited in item 11, the target chromaticity determining section employs the target chromaticity, corresponding to signal value "i" ("i" indicates a positive integer being equal to or greater than 2 and equal to or smaller than ($2^{n+m}-1$)) of the (n+m)-bit monochromatic image data, as a chromaticity of color display image data, which corresponds to (n+m)-bit monochromatic image data of signal value (i−1) and another chromaticity of the color image data, which corresponds to (n+m)-bit monochromatic image data of signal value (i−2); and the chromaticity selection unit selects primary-candidate color display image data, which have such a chromaticity that is calculated in the calculating step and makes an absolute difference value between color-difference ΔE(i−1) and color-difference ΔE(i−2) maximum, from the plurality of primary-candidate color display image data corresponding to the (n+m)-bit monochromatic image data of the signal value "i"; and the color-difference ΔE(i−1) is defined as a color-difference with color display image data, which corresponds to (n+m)-bit monochromatic image data of signal value (i−1), while, the color-difference ΔE(i−2) is defined as a color-difference with color display image data, which corresponds to (n+m)-bit monochromatic image data of signal value (i−2).

(14) According to yet another aspect of the present invention, in the image processing apparatus recited in item 9, the signal value determining section includes: a chromaticity selection unit to selects a plurality of primary-candidate color display image data, based on the contrast between each chromaticity of the plurality of candidate color display image data and the target chromaticity; and a luminance selection unit to determine signal values of the specific color display image data, based on a contrast between each luminance of the plurality of primary-candidate color display image data and the target luminance.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 4 is tables showing concrete example of candidate colors in a first embodiment of the present invention;

FIG. 19 is a table showing a conventional LUT.

DETAILED DESCRIPTION OF THE PREFERRED EMBODIMENTS

First Embodiment

Hereinafter, the first embodiment of the image display apparatus to which the image processing apparatus relating to the present invention is applied will be explained with reference to the accompanying drawings. However, the scope of the present invention is not limited to the illustrations.

Figure 1:
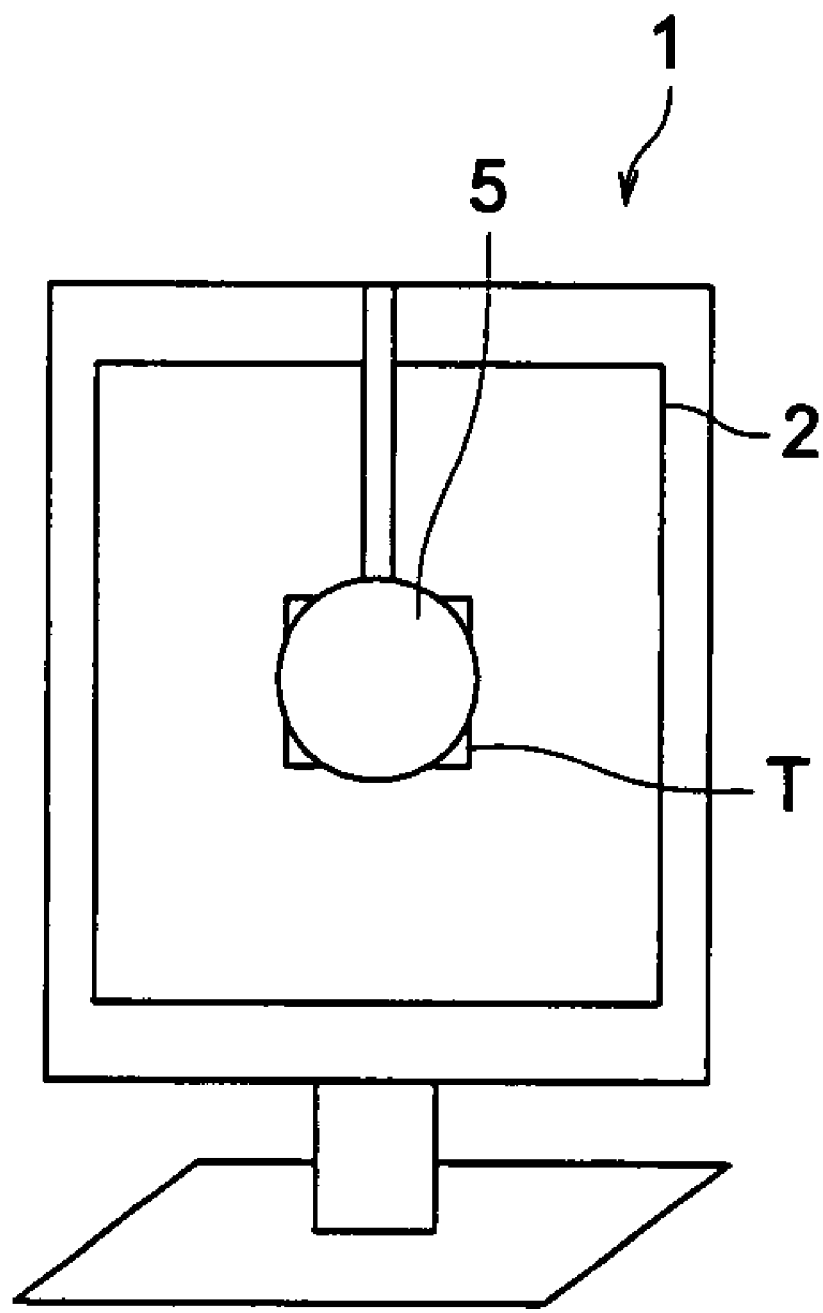
FIG. 1 is a front view of an image display apparatus embodied as a first embodiment of the present invention.
Figure 2:
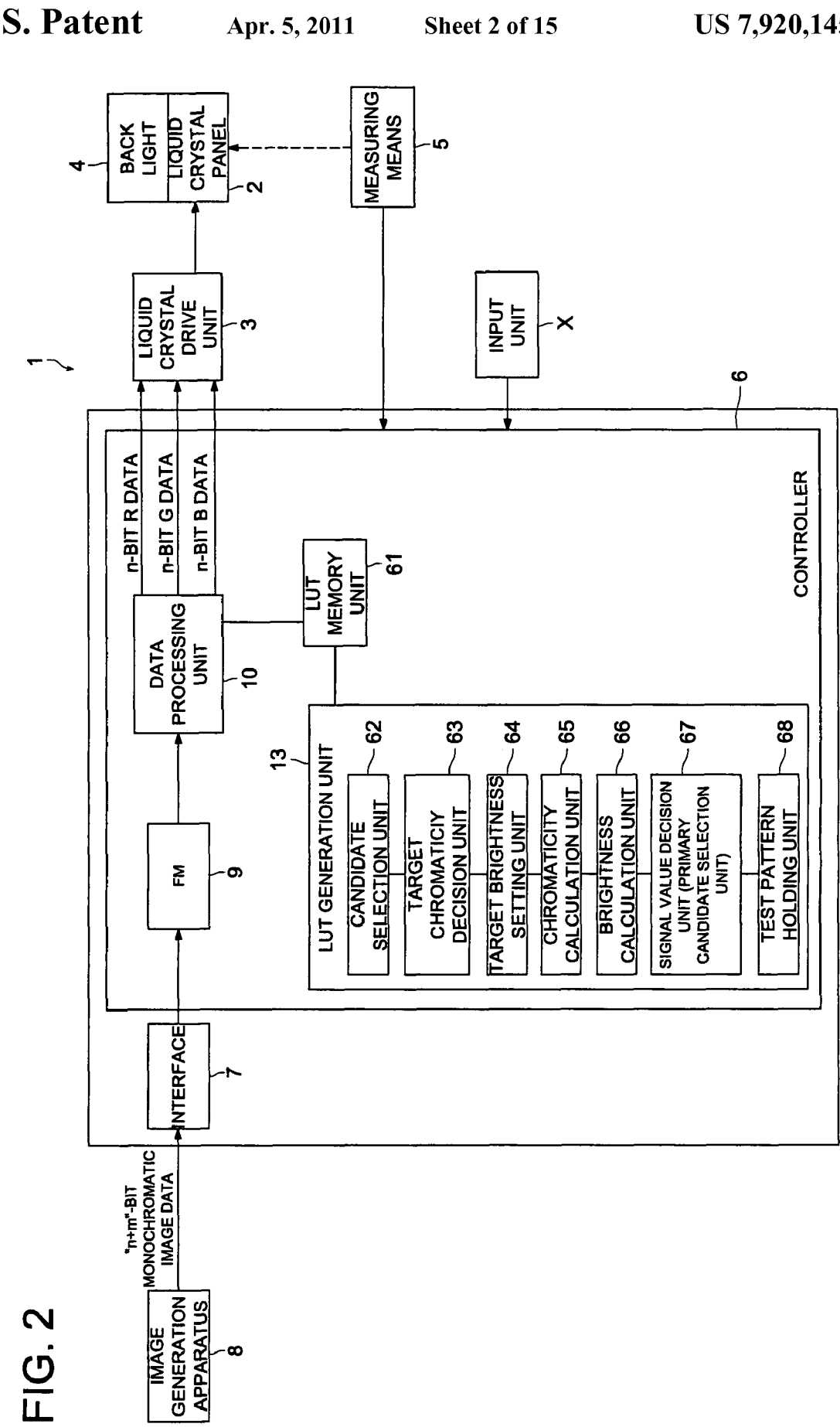
FIG. 2 is a block diagram of a brief configuration of an image display apparatus embodied as a first embodiment of the present invention.

FIG. 1 is a front view of an image display apparatus 1 relating to this embodiment. The image display apparatus 1, for example, is a monitor for a medical diagnostic apparatus. As shown in FIG. 2, the image display apparatus 1 includes a liquid crystal panel (LCD, liquid crystal display) 2 as a display unit for displaying a color image on the basis of an internal signal value and a liquid crystal drive unit 3 as a display drive unit for driving the display unit.

The kind of the liquid crystal panel 2 applicable to this embodiment is not restricted particularly and with respect to the method for the liquid crystal drive unit 3 to drive the liquid crystal panel 2, various drive methods such as the TN (twisted nematic) method, STN (super twisted nematic) method, MVA (multi-domain vertical alignment) method, and IPS (in-plane switching) method can be applied. Further, in this embodiment, the liquid crystal panel 2, by a color filter not drawn, can reproduce the 8-bit (256 grades) grayscale respectively for red (R), green (G), and blue (B).

Further, in this embodiment, a liquid crystal panel composed of three colors of red (R), green (G), and blue (B) is used, though the embodiment is not limited to the three colors of red (R), green (G), and blue (B) and for example, three colors of yellow (Y), magenta (M), and cyan (C) are acceptable. Further, four or more colors are acceptable and six colors of R, G, B, Y, M, and C or six colors of red (R1, R2), green (G1, G2), and blue (B1, B2) which are different in color tone are acceptable. The image process which will be described later is neither limited to three colors of red (R), green (G), and blue (B). Further, this embodiment can be applied to an image display apparatus for not only multi-color displaying by a color filter but also multi-color displaying by switching light sources of a plurality of colors.

Further, the image display apparatus 1 has a back light 4 for irradiating light to the liquid crystal panel 2 from the non-observation side. With respect to the back light 4, if it provides light sufficiently enough to illuminate the liquid crystal panel 2, for example, an LED, a cold cathode fluorescent tube, a hot cathode fluorescent tube, and other light emitting elements can be applied, though to suitably apply to a medical monitor, it is preferable to display an image at a maximum luminance of 500 to 5000 cd/m².

Further, the image display apparatus 1 has a measuring means 5 for measuring a display characteristic of an image displayed in a specific target area T of the liquid crystal panel 2. For the measuring means 5, a known sensor such as a luminance meter of a chromaticity meter can be used in accordance with the kind of the liquid crystal panel 2. The measuring means 5 is connected to an LUT generation unit 13 which will be described later and the LUT generation unit 13 measures the display characteristic displayed every switching of a test pattern displayed on the liquid crystal panel 2 and the measured results are outputted to the LUT generation unit 13.

The display characteristic of the liquid crystal panel 2 is information on the R, G, and B values inputted to the liquid crystal panel 2 and the luminance and/or chromaticity of the display light for them. For the information on the luminance and/or chromaticity, indexes of the color specification used generally can be used. For example, the XYZ color specification system, $X_{10}Y_{10}Z_{10}$ color specification system, xyz chromaticity coordinates, $x_{10}y_{10}z_{10}$ chromaticity coordinates, UCS chromaticity, L*a*b* color specification system, L*C*h* color specification system, and L*u*v* color specification system which are decided by the CIE may be cited, though the present invention is not limited to them.

The information on the luminance and/or chromaticity may be measured at predetermined timing using the measuring means 5 by displaying the test pattern in the target area T of the liquid crystal panel 2 or may store results obtained by displaying and measuring the test pattern on the liquid crystal panel 2 at time of shipment from the factory. Further, without using measured results for each display apparatus, the correspondence of the information on the luminance and/or chromaticity to the R, G, and B values may be stored as a predetermined conversion formula.

The position and magnitude of the specific target area T where the measuring means 5 measures the display characteristic are not restricted particularly, though in this embodiment, the region of an area of about 10% in the central part of the display screen of the liquid crystal panel 2 is designated. The measuring means 5 is connected online to the image display apparatus 1, though for example, it is possible to measure the display characteristic using a measuring means not connected online to the image display apparatus 1 and input the measured results to the image display apparatus 1 via an input means such as a keyboard.

Further, in the image display apparatus 1, for example, a controller 6 for controlling the liquid crystal drive unit 3 composed of a CPU (central processing unit), a ROM (read only memory) for storing various control programs, and a RAM (random access memory) for temporarily storing image data (these units are not drawn), an interface (I/F) 7 for connecting the controller 6 to an external apparatus, and an input unit 15 are installed.

To the interface 7, an image generation apparatus 8 as an external apparatus is connected. The image generation apparatus 8 supplies, for example, monochromatic image data 12 bits long, thus to the interface 7, an input signal value of the monochromatic image data (hereinafter, referred to as P value) is inputted. The image generation apparatus 8 is not restricted particularly, though for example, there are image processing apparatuses of various medical diagnostic apparatuses such as an X-ray diagnostic apparatus, an MRI (magnetic resonance imaging) diagnostic apparatus, and various CT (computed tomography) apparatuses.

In the controller 6, a frame memory (FM shown in FIG. 2) 9, a data processing unit 10, an LUT memory unit 61, and the LUT generation unit 13 are installed.

The frame memory 9 stores the monochromatic image data inputted from the image generation apparatus 8 via the interface 7.

The data processing unit 10 data-distributes 1-channel monochromatic image data inputted from the frame memory 9 to three channels of R, G, and B and converts it to 8-bit R, G, and B display image data. Here, in this embodiment, the data processing unit 10 of the controller 6 converts monochromatic image data (n+m) (n indicates a positive integer of 8 or more and m indicates a positive integer of 2 or more) bits long to R, G, and B display image data n bits long on the basis of a preset correspondence. Concretely, the data processing unit 10, on the basis of the LUT as a correspondence pre-stored in the LUT memory unit 61, data-distributes monochromatic image data 12 bits long to R, G, and B values and converts it to R, G, and B image data 8 bits long. Namely, in this embodiment, the measuring means 5, controller 6, and input unit X function as an image processing apparatus relating to the present invention.

In this embodiment, the liquid crystal panel 2 displays an image in three colors of R, G, and B, so that the monochromatic image data is converted to R, G, and B display image data as color display image data of three channels of R, G, and B, though when displaying an image in four or more colors by the display apparatus, it is desirable to convert it to image data of the number of channels in correspondence to the number of colors displayed.

The LUT generation unit 13 includes a candidate selection unit 62, a target chromaticity decision unit 63, a target luminance decision unit 64, a chromaticity calculation unit 65, a luminance calculation unit 66, a signal value decision unit 67, and a test pattern holding unit 68 and functions as a correspondence generation unit for generating an LUT as a correspondence on the basis of the display characteristic of the liquid crystal panel 2. The LUT generation unit 13 is connected to the LUT memory unit 61, which stores an LUT generated by the LUT generation unit 13. Here, the LUT generation unit 13, at time of shipment of the image display apparatus 1 from the factory or every lapse of a specified period of time, measures the display characteristic of the liquid crystal panel 2 which will be described later and generates an LUT.

The target chromaticity decision unit 63 decides a target chromaticity corresponding to each signal value of the monochromatic image data and the target luminance setting unit 64 decides a target luminance corresponding to each signal value of the monochromatic image data.

The test pattern holding unit 68 holds a plurality of solid image data (R, G, and B values) displayed as a test pattern on the liquid crystal panel 2. The number and kind of held test patterns are not restricted particularly, and when all combinations of R, G, and B values are used as a test pattern, an precise display characteristic can be preferably measured, though all the combinations of R, G, and B values include about 16.77 millions (=$256^3$) colors, so that it is difficult to realize it. Therefore, it is preferable to restrict beforehand combinations of R, G, and B values under a predetermined condition.

In this embodiment, 256 colors in which the R, G, and B values are equivalent are used as a test pattern. Further, to improve the accuracy of measurement, it is possible to display and measure a combination in which at least one of the equivalent R, G, and B values is increased or decreased within a predetermined range as a test pattern.

The LUT generation unit 13 measures color irritant values X, Y, and Z when a test pattern is displayed by the measuring means 5 and inputs measured results. Here, the value indicated by Y among the color irritant values indicates luminance.

The chromaticity calculation unit 65 calculates chromaticity for each of the candidate R, G, and B display image data selected by the candidate selection unit 62 and the luminance calculation unit 66 calculates luminance for each of the candidate R, G, and B display image data selected by the candidate selection unit 62.

The chromaticity calculation unit 65 and luminance calculation unit 66, on the basis of the color irritant values of the test pattern measured by the measuring means 5 and the R, G, and B values, generate an RGB-XYZ estimation formula for approximately estimating color irritant values X, Y, and Z when R, G, and B image data of combination of unmeasured R, G, and B values are displayed on the liquid crystal panel 2. The RGB-XYZ estimation formula is expressed by a general Formula (1) indicated below.

Formula 1

$$\begin{pmatrix} (X - X\min)/(X\max - X\min) \\ (Y - Y\min)/(Y\max - Y\min) \\ (Z - Z\min)/(Z\max - Z\min) \end{pmatrix} = \begin{pmatrix} C_{XR} & C_{XG} & C_{XB} \\ C_{YR} & C_{YG} & C_{YB} \\ C_{ZR} & C_{ZG} & C_{ZB} \end{pmatrix} \begin{pmatrix} (R/255)^\gamma \\ (G/255)^\gamma \\ (B/255)^\gamma \end{pmatrix} \quad (1)$$

The generation method of the general Formula (1) is not restricted particularly, though for example, a method, in the general Formula (1), for obtaining γ and 10 unknown variables of $C_{XR}$, $C_{XG}$, - - - by the method of least squares can be applied. Further, there is an advantage available that as the number of test patterns to be displayed is increased, an accurate RGB-XYZ estimation formula can be generated. On the other hand, there is an advantage available that as the number of test patterns to be displayed is decreased, an RGB-XYZ estimation formula can be generated in a short time.

The chromaticity calculation unit 65 and luminance calculation unit 66, on the basis of the general Formula (1) indicated above, calculate chromaticity information and luminance information respectively corresponding to internal signal values of the monochromatic image data.

Figure 3:
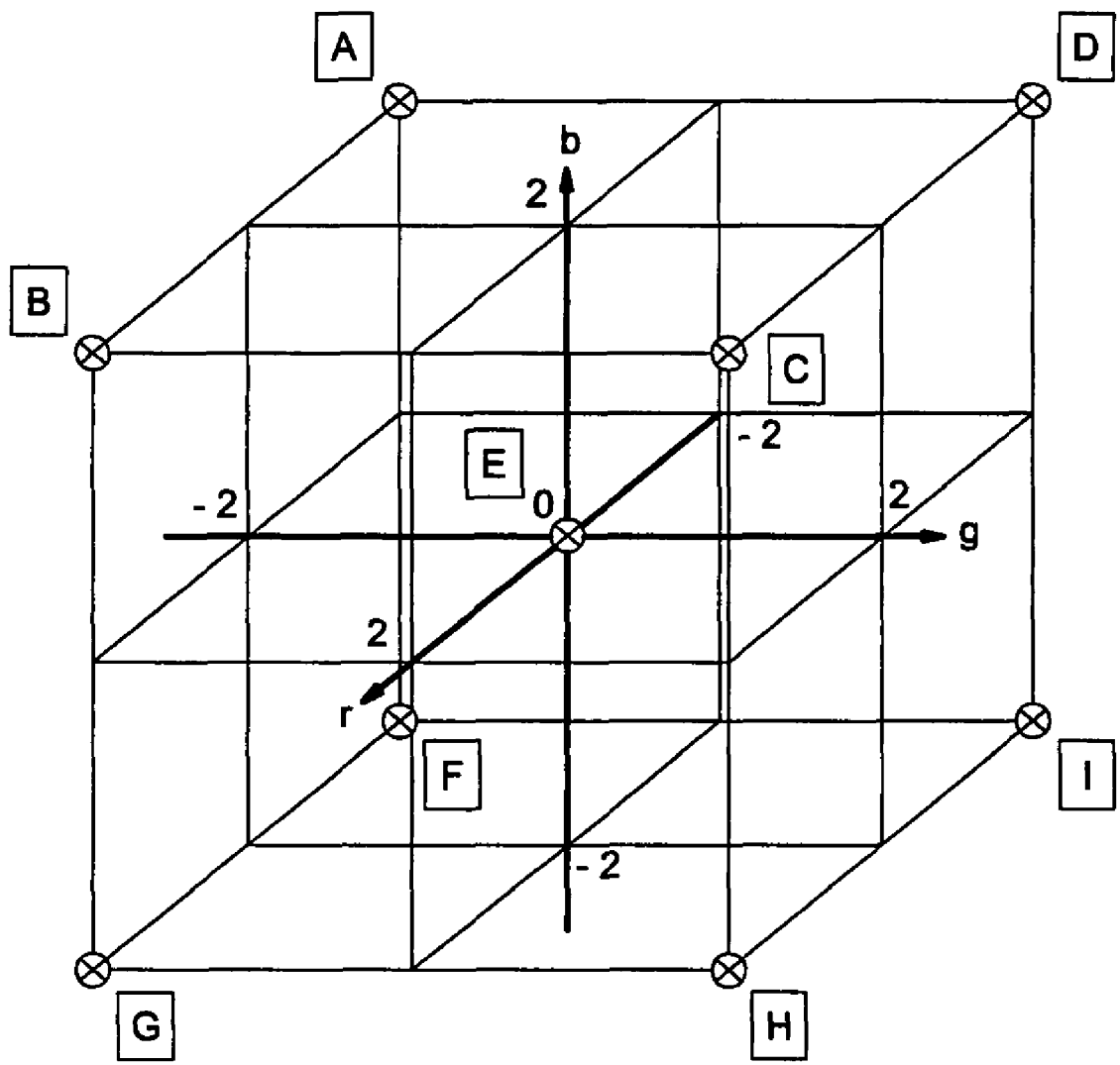
FIG. 3 is an explanatory schematic diagram showing a range of candidate color in a first embodiment of the present invention.

The candidate selection unit 62, for the respective internal signal values of the monochromatic image data, from the R, G, and B display image data having about 16.77 millions ($=256^3$) signal values, selects a plurality of candidate R, G, and B display image data (candidate colors). Here, the candidate color, assuming the color having equivalent R, G, and B values corresponding to an internal signal value k as a reference color, is referred to as a color obtained by increasing or decreasing the R, G, and B values within the range of ±2. As shown in FIG. 3, for the candidate color, in general, 125 (=5×5×5) colors may be cited for one internal signal value (E shown in the drawing), though when candidate colors of different internal signal values are duplicated, the results calculated once may be used. In that case, as shown in FIG. 4, there are 55 candidate colors.

Further, for each of the internal signal values of the monochromatic image data, the candidate colors may be selected every decision of the R, G, and B values corresponding to the internal signal value k or candidate colors for all the internal signal values k may be selected beforehand.

The signal value decision unit 67 decides the R, G, and B values of the R, G, and B display image data (hereinafter, also referred to as signal values of color display image data) corresponding respectively to the internal signal values of the monochromatic image data. Further, the signal value decision unit 67, from the candidate R, G, and B display image data, on the basis of the luminance information from the target luminance setting unit 64 and luminance calculation unit 66, selects primarily a plurality of the primary candidate R, G, and B display image data. Furthermore, the signal value decision unit 67, from the primary candidate R, G, and B display image data, on the basis of the chromaticity information from the target chromaticity decision unit 63 and chromaticity calculation unit 65, decides one selection color (decision of the signal values of the color display image data) and sets the R, G, and B values thereof for correspondence as R, G, and B display image data.

Next, the image processing apparatus control method relating to the present invention will be explained.

Firstly, the LUT generation process executed by the LUT generation unit 13 will be explained in detail. The LUT generation process is a process of generating or correcting an LUT so as to display a monochromatic image of an appropriate color tone by the image display apparatus 1 and for example, at time of shipment of the image display apparatus 1, the process is started by the operation of the input unit 15.

Figure 5:
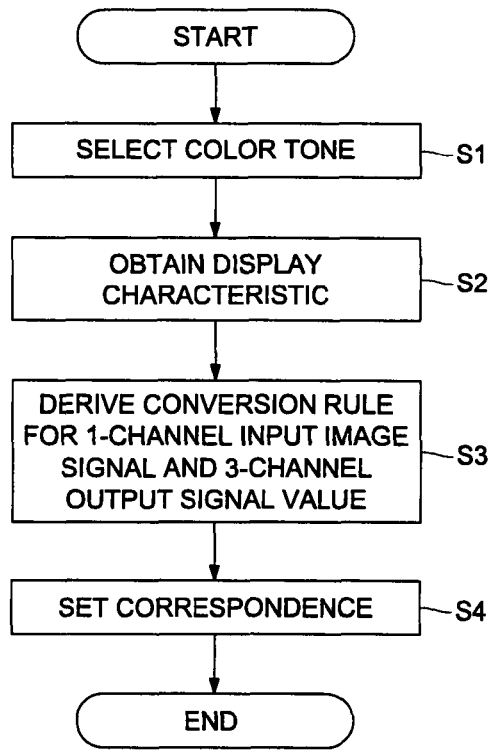
FIG. 5 is a flowchart showing a conversion rule generation process in a first embodiment of the present invention.

In the LUT generation process, a conversion rule generation process as a correspondence generation process in this embodiment is executed (refer to FIG. 5). The conversion rule generation process is broadly divided into a process of selecting the color tone of a display image desired by a user (Step S1), a process of obtaining the display characteristic of the liquid crystal panel 2 (Step S2), a process of deriving a conversion rule (Step S3), and a correspondence setting process (Step S4).

Figure 6:
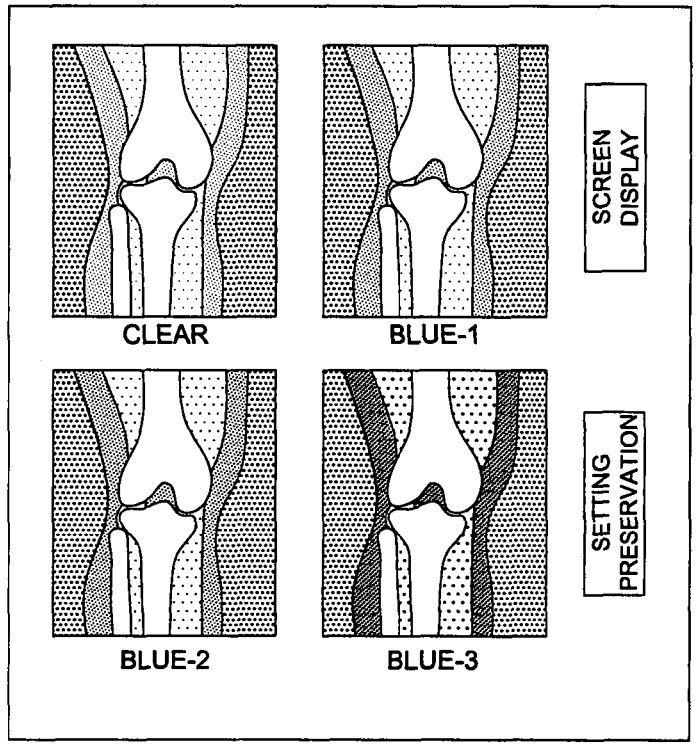
FIG. 6 is an explanatory schematic diagram showing images on a screen to be displayed in a color tone selection process of a first embodiment of the present invention.

In the color tone selection process (Step S1), for example, a plurality of screens of different color tones as shown in FIG. 6 are displayed on the liquid crystal panel 2, and a desired display image color tone is selected by a user using the input unit X (refer to FIG. 2) such as a mouse, and the information is stored. In FIG. 6, four kinds of X-ray transmitted images in total including the color tone of neutral gray and three kinds of bluish color tones different in depth are shown, and the process is structured so as to click the mouse pointer on the image of the color tone desired by the user, thereby select the color tone, though the color tone selection method is not limited to it.

In the display characteristic acquisition process (Step S2), the correspondence of the R, G, and B values inputted to the liquid crystal panel 2 to the information on the luminance and/or chromaticity of the display light from the liquid crystal panel 2 is obtained. More in detail, in the display characteristic acquisition process (Step S3), the image display apparatus 1 measures the display characteristic of the liquid crystal panel 2 by the LUT generation unit 13. Namely, the LUT generation unit 13 makes the liquid crystal panel 2 display sequentially the test patterns held by the test pattern holding unit 68 and makes the measuring means 5 measure the color irritant values X, Y, and Z of the CIE XYZ color specification system every display switching of the test pattern.

The chromaticity calculation unit 65 and luminance calculation unit 66, on the basis of the R, G, and B values of the test pattern and the measured color irritant values X, Y, and Z, generate the RGB-XYZ estimation formula expressed by the general Formula (1). Here, the LUT generation unit 13, to generate a more accurate RGB-XYZ estimation formula, may display the color in which the R, G, and B values of the test pattern are increased or decreased within a predetermined range as a test pattern and measure the color irritant values of the liquid crystal panel 2. The increasing and decreasing range of the R, G, and B values of the test pattern is not restricted particularly, though to prepare a more accurate estimation formula, the concerned range preferably coincides with the range of candidate colors.

The conversion rule derivation process (Step S3), on the basis of the correspondence of the information on the luminance and/or chromaticity to the R, G, and B values of the test pattern, derives an LUT as a conversion rule for converting a 1-channel monochromatic image signal value (m+n bits) to 3-channel R, G, and B values (m bits). In other words, the signal value decision unit 67 serves as a signal value determining section in the conversion rule derivation process (Step S3). Further, in this embodiment, an LUT is generated as a conversion rule, though a conversion formula is acceptable. Further, one conversion formula or one LUT is acceptable and a combination of multi-grade conversion rules is acceptable.

The correspondence setting process (Step S4) makes the LUT memory unit 61 store the aforementioned conversion rule derived by the conversion rule derivation process (Step S3) as a correspondence. Namely, in the correspondence setting process (Step S4), the LUT generation unit 13 functions as a correspondence setting means.

Here, the conversion rule derivation process (Step S3) will be explained in detail by referring to FIG. 7.

Firstly, the LUT generation unit 13, on the basis of the display characteristic of the liquid crystal panel 2, generates DICOM calibration conversion rule for relating the internal signal value to the P value (Step S31). Here, the DICOM calibration conversion rule is preferably generated as an LUT. Further, the display luminance to the P value is preferably generated so as to correspond to the GSDF (Grayscale Standard Display Function) specified in DICOM PS 3.14 and by the DICOM calibration which is conventionally known, the display luminance to the P value may be generated using the grayscale standard display function.

Figure 8:
FIG. 8 is an explanatory schematic diagram showing tables indicating a relationship between a test pattern and displaying characteristics in a first embodiment of the present invention.
Figure 9:
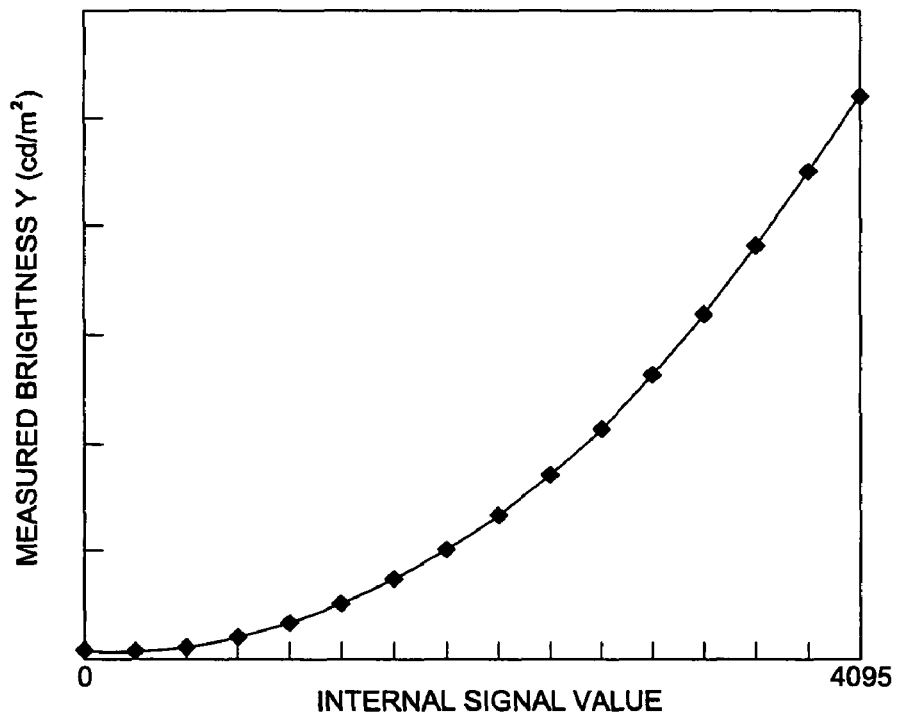
FIG. 9 is an explanatory schematic diagram showing a graph for generating the GSDF (Grayscale Standard Display Function) in a first embodiment of the present invention.
Figure 10:
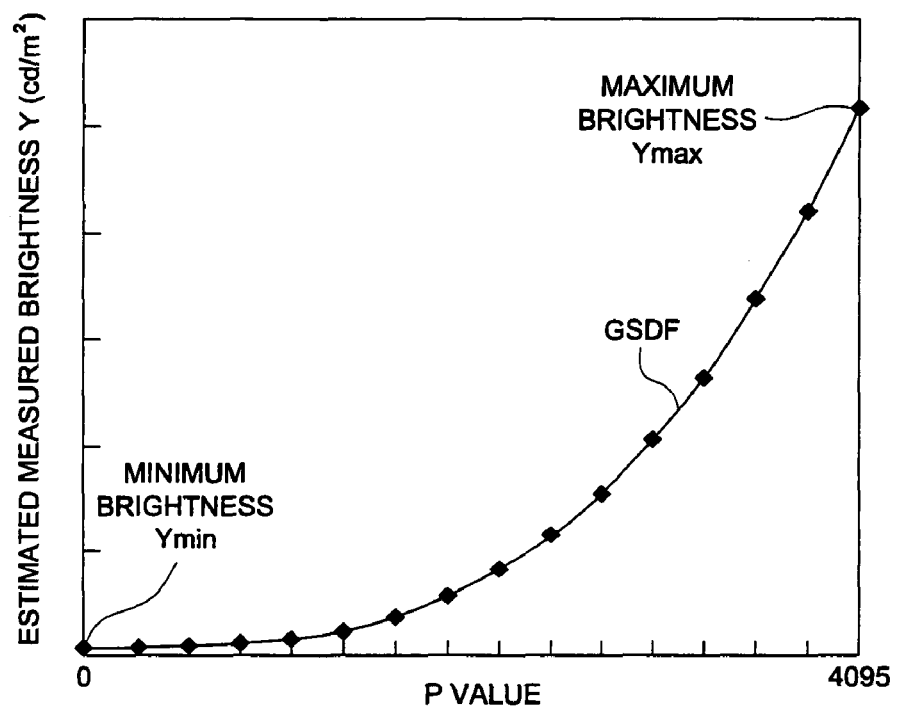
FIG. 10 is another explanatory schematic diagram showing a graph for generating the GSDF (Grayscale Standard Display Function) in a first embodiment of the present invention.

The measured results by the measuring means 5 are outputted to the controller 6 and the LUT generation unit 13 brings the R, G, and B values into correspondence to the luminance of the test pattern. In this case, the LUT generation unit 13, as shown in Table A in FIG. 8, to the internal signal values of 16 grades at 273 intervals among the internal signal values (0 to 4095) of 4096 grayscales, allocates the R, G, and B values of 16 grades at 17 intervals among the test pattern signal values R, G, and B of 256 grayscales, and brings the measured luminance at the respective R, G, and B values into correspondence to them. And, the LUT generation unit 13 brings the respective internal signal values into correspondence to the R, G, and B values by proportional allotment. In this case, the R, G, and B values may not always be integers. Furthermore, when the estimated measured luminance corresponding to the R, G, and B values is calculated, for example, using the general Formula (1) aforementioned, the estimated measured luminance (refer to Table B and FIG. 9) for the internal signal values of 4096 grayscales are estimated. Then, the LUT generation unit 13 obtains the lowest luminance and highest luminance of the estimated measured luminance and allocates the maximum luminance to the lowest luminance to the P values of 4096 grayscales on the basis of the GSDF (refer to FIG. 10).

Figure 11A:
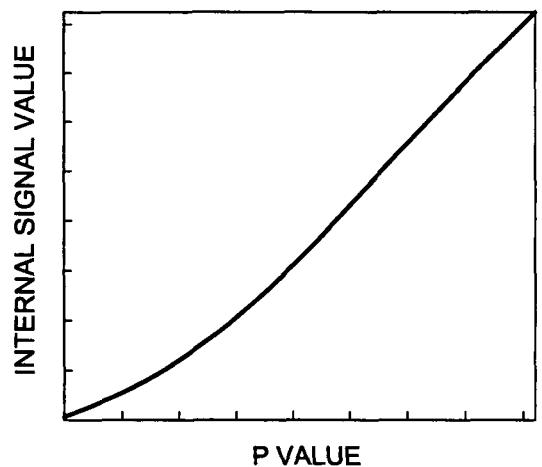
FIG. 11(a), FIG. 11(b) and FIG. 11(c) are still other explanatory schematic diagrams showing graphs for generating the GSDF (Grayscale Standard Display Function) in a first embodiment of the present invention.
Figure 11B:
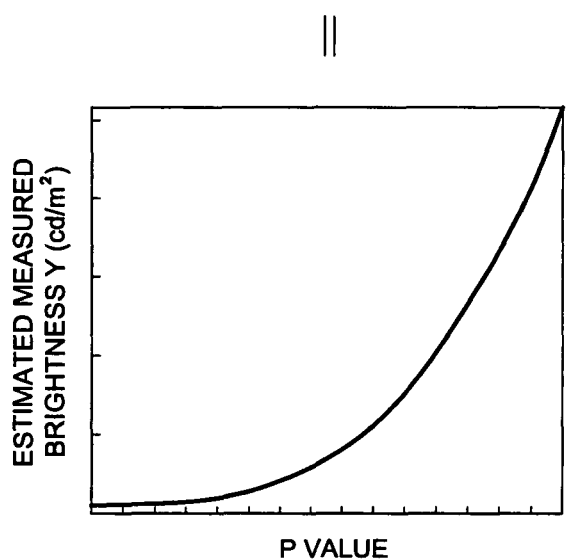
Figure 11C:
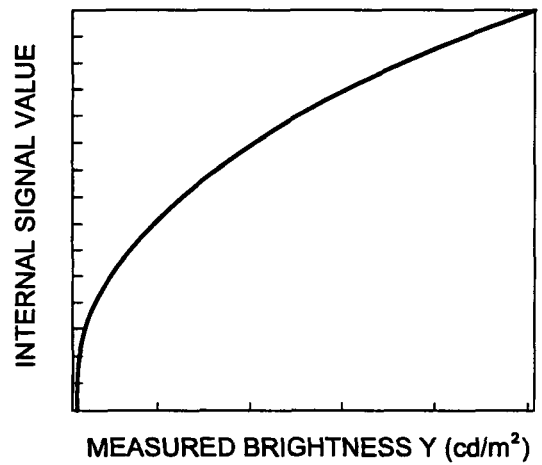

And, as shown in FIG. 11, a calibration LUT for relating the internal signal values to the P values is generated. When the image display apparatus 1 is adjusted to the characteristic of the GSDF curve, the internal signal values and P values are equivalent and the generated calibration LUT is a proportional straight line at a slope of 1. On the other hand, when the image display apparatus 1 is not adjusted, the calibration LUT is a curved line in accordance with the characteristic of the liquid crystal panel 2.

The candidate selection process, by the candidate selection unit 62, for the respective internal signal values of the monochromatic image data, from among the R, G, and B display image data having $256^3$ signal values, limits the selection subject to a plurality of candidate R, G, and B display image data (candidate colors) (Step S32). By restriction to the candidate colors, the calculation time when performing the subsequent processes can be preferably shortened.

The signal value determining process, from among the selected candidate colors, selects R, G, B values based on the luminance and chromaticity (decision of the signal values of color display image data, Step S33). The R, G, B values based on the luminance and chromaticity are selected in this way, thus the image chromaticity and the number of grayscales can be made compatible with each other.

Figure 12:
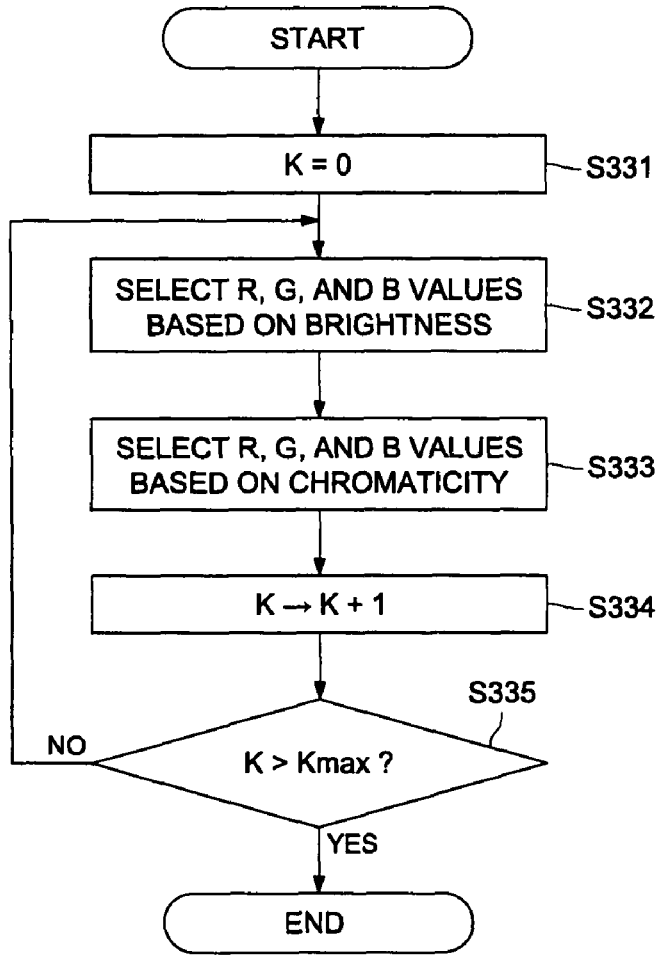
FIG. 12 is a flowchart showing operations for selecting R, G and B values in a first embodiment of the present invention.

Here, the selection of the R, G, B values in the signal value determining process will be explained by referring to FIG. 12.

Firstly, assuming k=0 (Step S331), a target luminance Y (k) for the internal signal value k is decided by the target luminance setting unit 64. Here, the target luminance Y (k) is referred to as luminance of an image which will be represented on the liquid crystal panel 2 when the P value, which will be the internal signal value k, is inputted to the image display apparatus 1. Concretely, the estimated measured luminance shown in Table B can be used as a target luminance Y (k).

Figure 13:
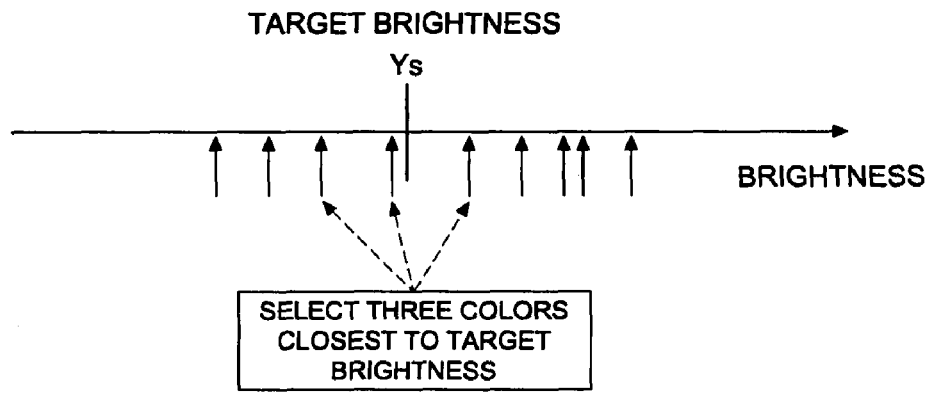
FIG. 13 is an explanatory schematic diagram showing a primary selection based on luminance in a first embodiment of the present invention.

Then, the luminance calculation unit 66 calculates luminance Y of each candidate color using the general Formula (1) aforementioned (the luminance calculation process). And, as shown in FIG. 13, by the signal value decision unit 67, N candidate colors A to C (primary candidate R, G, and B display image data) nearest to the target luminance Y (k) are selected primarily (Step S332, the luminance selection process). Here, in this embodiment, the number N of candidate colors selected primarily is taken as 3, though the value of N is not restricted particularly and can be changed as appropriate.

Next, the chromaticity calculation unit 65, for the respective candidate colors A to C, calculates the color irritant values X, Y, and Z using the general Formula (1) and obtains the chromaticity on the basis of the color irritant values calculated (the chromaticity calculation process). Here the chromaticity (L*, a*, b*) is generally a CIE L*a*b* color specification system indicated using the color irritant values X, Y, and Z and the following Formulas (2) to (4).

Formula 2
$$L^* = 116(Y/Yo)^{\frac{1}{3}} - 16 \tag{2}$$
Formula 3
$$a^* = 500\left\{(X/Xo)^{\frac{1}{3}} - (Y/Yo)^{\frac{1}{3}}\right\} \tag{3}$$
Formula 4
$$b^* = 200\left\{(Y/Yo)^{\frac{1}{3}} - (Z/Zo)^{\frac{1}{3}}\right\} \tag{4}$$

Further, the target chromaticity decision unit 63 assumes the chromaticity of the R, G, and B values selected for the internal signal value (k−1) of the monochromatic image data as target chromaticity (the chromaticity decision process). And, the signal value decision unit 67 obtains a color difference ΔE*ab (k−1) in the CIE L*a*b* color specification system between the target chromaticity obtained in this way and the estimated chromaticity of the candidate colors A to C and selects secondarily a color having a minimum |ΔE*ab (k−1)| among the candidate colors A to C as a selection color (Step S333, the chromaticity selection process). For example, as shown in FIG. 13, when the estimated chromaticity of the candidate color A is nearest to the target chromaticity, the candidate color A is a selection color. Further, the R, G, and B values of the selection color are set to correspondence as the R, G, and B display image data.

The color difference ΔE*ab (k−1) in the CIE L*a*b* color specification system is defined by Formula (5) indicated below, though it may be defined as Formula (6) excluding the influence of an index L* corresponding to the luminance.

Formula 5

$$\Delta E^*ab = \{(\Delta L^*)^2 + (\Delta a^*)^2 + (\Delta b^*)^2\}^{1/2} \quad (5)$$

Formula 6

$$\Delta E^*ab = \{(\Delta a^*)^2 + (\Delta b^*)^2\}^{1/2} \quad (6)$$

Namely, in the chromaticity selection process, the chromaticity of the R, G, and B display image data corresponding to the monochromatic image data of the internal signal value k−1 is assumed as a target chromaticity. And, the chromaticity selection process, among the primary candidate R, G, and B display image data corresponding to the monochromatic image data of the internal signal value k, selects the R, G, and B display image data of the chromaticity having a minimum color difference from the target chromaticity, and establishes the selected R, G, and B display image data as the R, G, and B values of the internal signal value k. According to the abovementioned process, it becomes possible to suppress the chromaticity variations between the R, G, and B display image data of the continuous internal signal value k, and accordingly, when looking at the liquid crystal panel 2 at an ordinary observation capacity, as a whole, the grayscale continuity of chromaticity can be stabilized.

Figure 14:
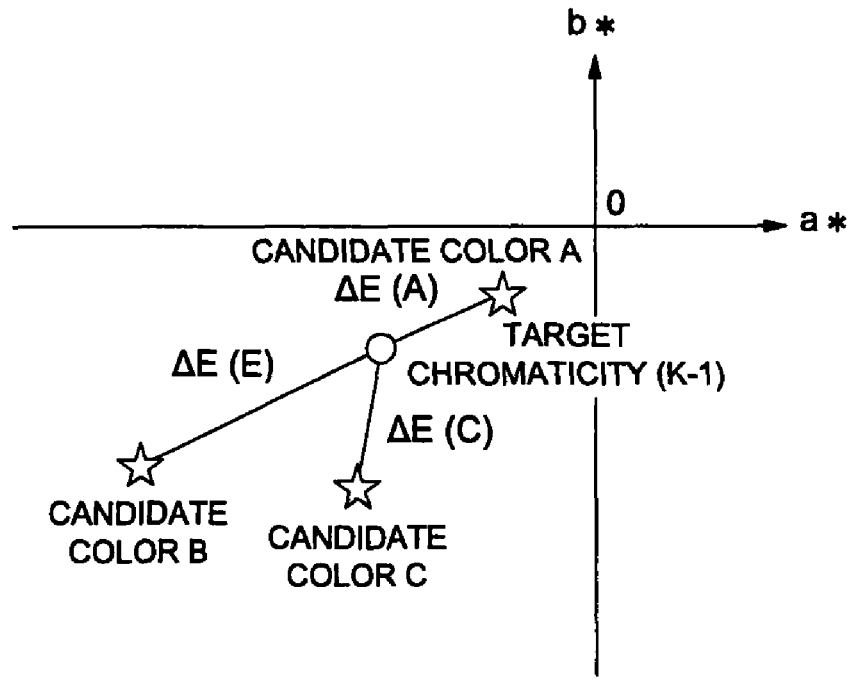
FIG. 14 is an explanatory schematic diagram showing a selection based on chromaticity in a first embodiment of the present invention.
Figure 15:
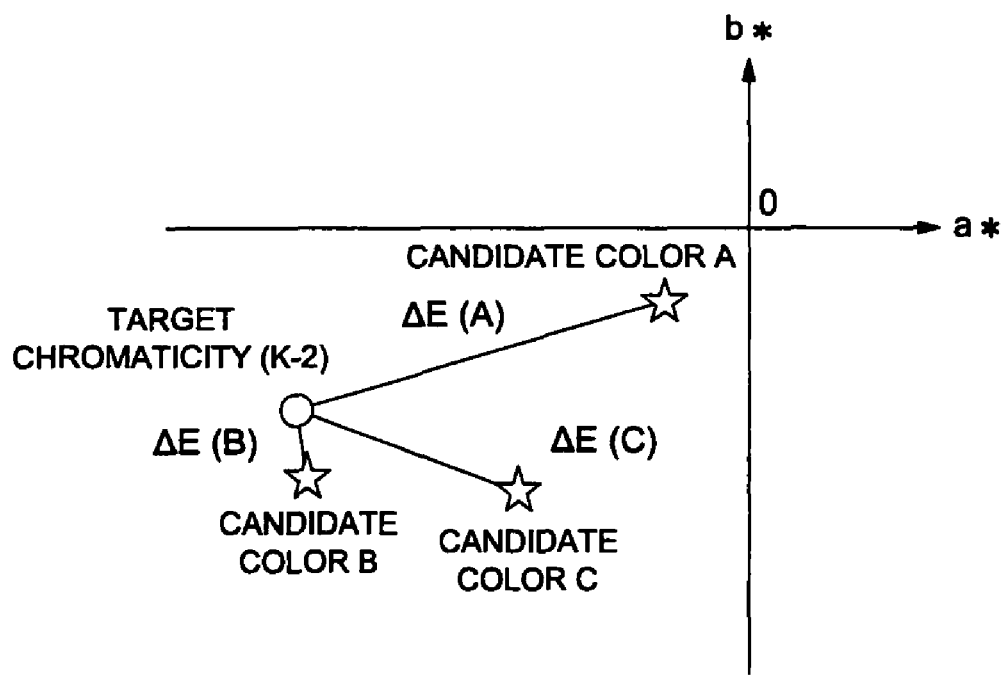
FIG. 15 is another explanatory schematic diagram showing a selection based on chromaticity in a first embodiment of the present invention.

Further, the number of target chromaticities used in the chromaticity selection process is not restricted particularly. For example, the target chromaticity corresponding to the monochromatic image data of the internal signal value k is assumed as the chromaticity of the R, G, and B display image data corresponding to the monochromatic image data of the internal signal value k−1 and the chromaticity of the R, G, and B display image data corresponding to the monochromatic image data of the internal signal value k−2 (refer to FIGS. 14 and 15). Further, among the primary candidate R, G, and B display image data corresponding to the monochromatic image data of the internal signal value k, the color difference from the chromaticity of the R, G, and B display image data corresponding to the monochromatic image data of the internal signal value k−1 is taken as |ΔE*ab (k−1)| and the color difference from the chromaticity of the R, G, and B display image data corresponding to the monochromatic image data of the signal value k−2 is taken as |ΔE*ab (k−2)|. And, the R, G, and B display image data in which |ΔE*ab (k−1)|−|ΔE*ab (k−2)| is maximized can be selected. In the examples shown in FIG. 14 and FIG. 15, the candidate color B is selected. Accordingly, when selecting the R, G, and B display image data in this way, the R, G, and B display image data in which the variation in the chromaticity at the signal value of the neighboring monochromatic image data is maximized within the permissible range of a user and the R, G, and B display image data in which it is minimized are selected alternately. Accordingly, the chromaticity difference between the R, G, and B display image data corresponding to the signal value of the neighboring monochromatic image data are getting large. However, generally speaking, when looking at the liquid crystal panel 2 at an ordinary observation capacity, since the density of the adjacent pixels is higher than the special frequency being visually recognizable, the chromaticity difference between adjacent display pixels cannot be clearly recognized, but recognized as a smooth plane as a whole. Namely, it becomes possible to stabilize the gradation continuity of chromaticity, even in an image in which the low luminance portion and high luminance portion are neighboring with each other.

The LUT generation unit 13 takes the R, G, and B values of the color selected in this way as R, G, and B values corresponding to the internal signal value k. Then, the LUT generation unit 13, also for the internal signal value k+1, selects similarly the R, G, and B values (Step S334, NO at Step S335), selects the R, G, and B values for all the internal signal values of 4096 grayscales, and finishes the generation of the LUT (YES at Step S335).

Figure 16:
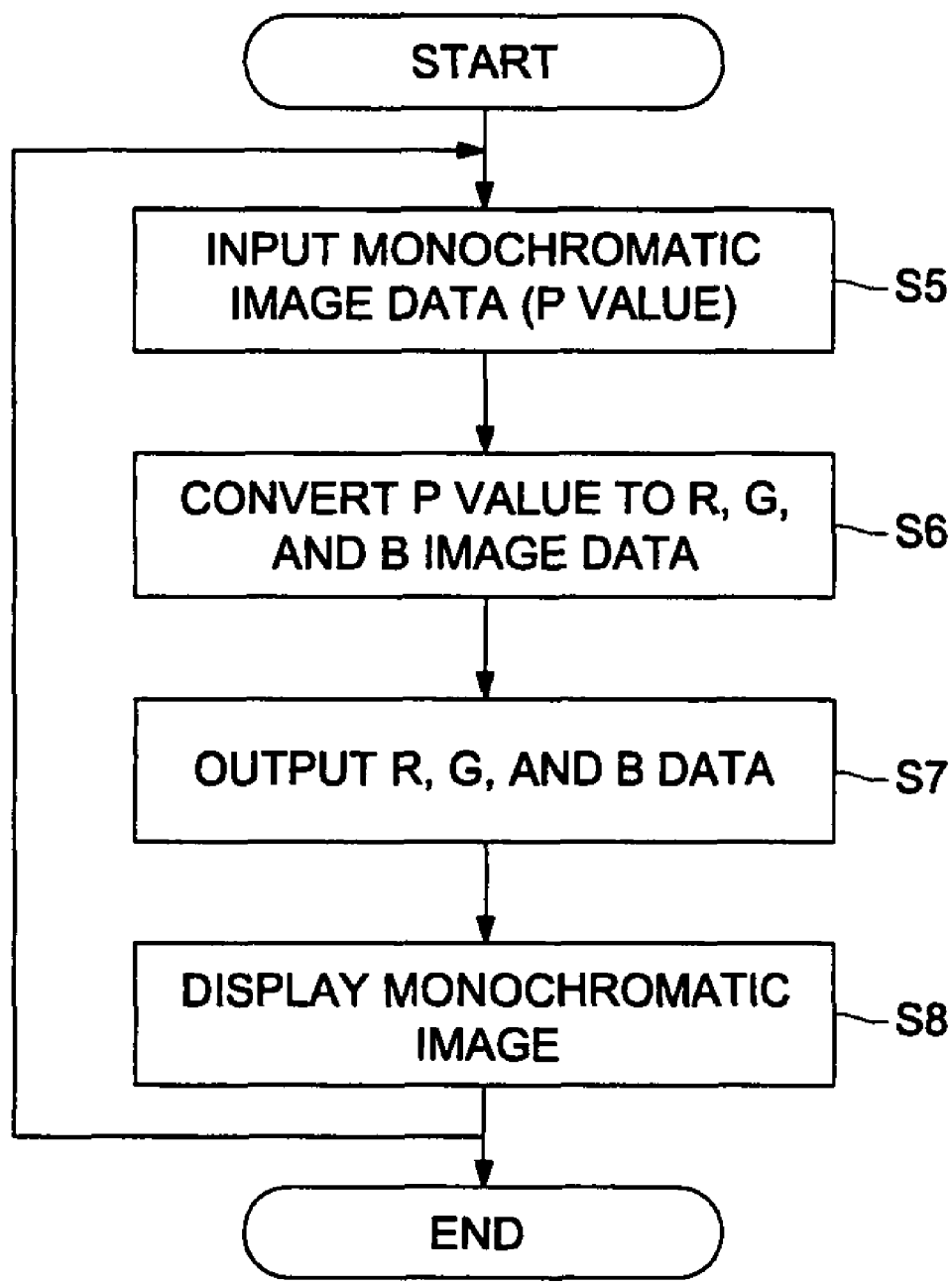
FIG. 16 is a flowchart showing an image display method in a first embodiment of the present invention.

Next, the image display method by the image display apparatus 1 will be explained by referring to FIG. 16.

Firstly, 10-bit monochromatic image data is inputted to the image display apparatus 1 from the image generation apparatus 8 (Step S5). The input monochromatic image data is inputted to the controller 6 via the interface 7. The monochromatic image data inputted to the controller 6 is stored in the frame memory 9.

The monochromatic image data stored in the frame memory 9 is outputted sequentially to the data processing unit 10. The data processing unit 10, firstly, data-distributes the P value of the monochromatic image data to the R, G, and B values on the basis of the LUT stored beforehand in the LUT memory unit 61 and converts it to 8-bit R, G, and B image data (Step S6).

At Step S6, the data processing unit 10 performs the DICOM calibration LUT process for the P value, thereby converts it to the internal signal value k, and then performs the LUT process of converting the internal signal value k to the R, G, and B values. Here, the LUT process does not need to be composed of 2 grades and for example, an LUT composed of a calibration LUT and a conversion LUT from an internal signal value to R, G, and B values is prepared and one process using the composite LUT may be used as an LUT process.

The R, G, and B image data converted at Step S6 is outputted to the liquid crystal drive unit 3 (Step S7) and the liquid crystal drive unit 3 displays an image based on the R, G, and B image data and realizes a 10-bit monochromatic image (Step S8). Further, this embodiment is explained by the process free of frame division display, though the frame division display is also available. In the case of frame division display, the R, G, and B image data converted at Step S6 is divided into four frame data, and the respective frame data is stored in a second frame memory not drawn, and the stored frame data is outputted to the liquid crystal drive unit 3 by switching sequentially. By doing this, a monochromatic image 12 or more bits long can be represented.

As mentioned above, according to the image display apparatus 1 relating to the present invention, the characteristic of the liquid crystal panel 2 is measured and an LUT is generated or corrected, so that a monochromatic image can be reproduced precisely without being influenced by variations in the display characteristic of the liquid crystal panel 2.

Further, a selection color is selected from among a plurality of candidate colors in which the R, G, and B values for the internal signal value are respectively shifted within the range of ±2, so that the color choices for one internal signal value can be increased, and a multi-grayscale display exceeding the grayscale characteristic of the display unit is available, and an image of a high grayscale resolution can be represented on the display unit. Concretely, in an LUT having equivalent R, G, and B values, images of 256 colors are just displayed, though when the R, G, and B values are shifted respectively within the range of ±2, 125 candidate colors may be cited for one internal signal value, so that images of about 14000 colors can be displayed. Therefore, regardless of the grayscale resolution of the liquid crystal panel 2, an image of more grayscales like a medical image can be displayed.

Further, the luminance and chromaticity can be estimated using the RGB-XYZ estimation formula, so that the target luminance can be estimated from the internal signal value and furthermore the chromaticity displayed on the liquid crystal panel 2 can be estimated from the R, G, and B values. And, colors are selected twice from among a plurality of candidate colors using the estimation formula, thus the selection color is decided, so that there is no need to estimate the luminance and chromaticity for all the candidate colors, and the time required for the LUT correction process can be shortened, and the process can be simplified.

Further, the range of candidate colors is not restricted particularly, though there is an advantage that as the range of candidate colors is widened, a precise LUT can be prepared. On the other hand, there is an advantage that as the range of candidate colors is narrowed, an LUT can be prepared in a short time.

Further, in this embodiment, the controller 6 is built in the image display apparatus 1, though a personal computer may take over the function of the controller 6.

Further, in this embodiment, even if the FRC display is not used, a multi-grayscale representation is available, though if the multi-grayscale representation is combined with the FRC display, a constitution of displaying an image of more grayscales may be used.

Second Embodiment

Figure 17:
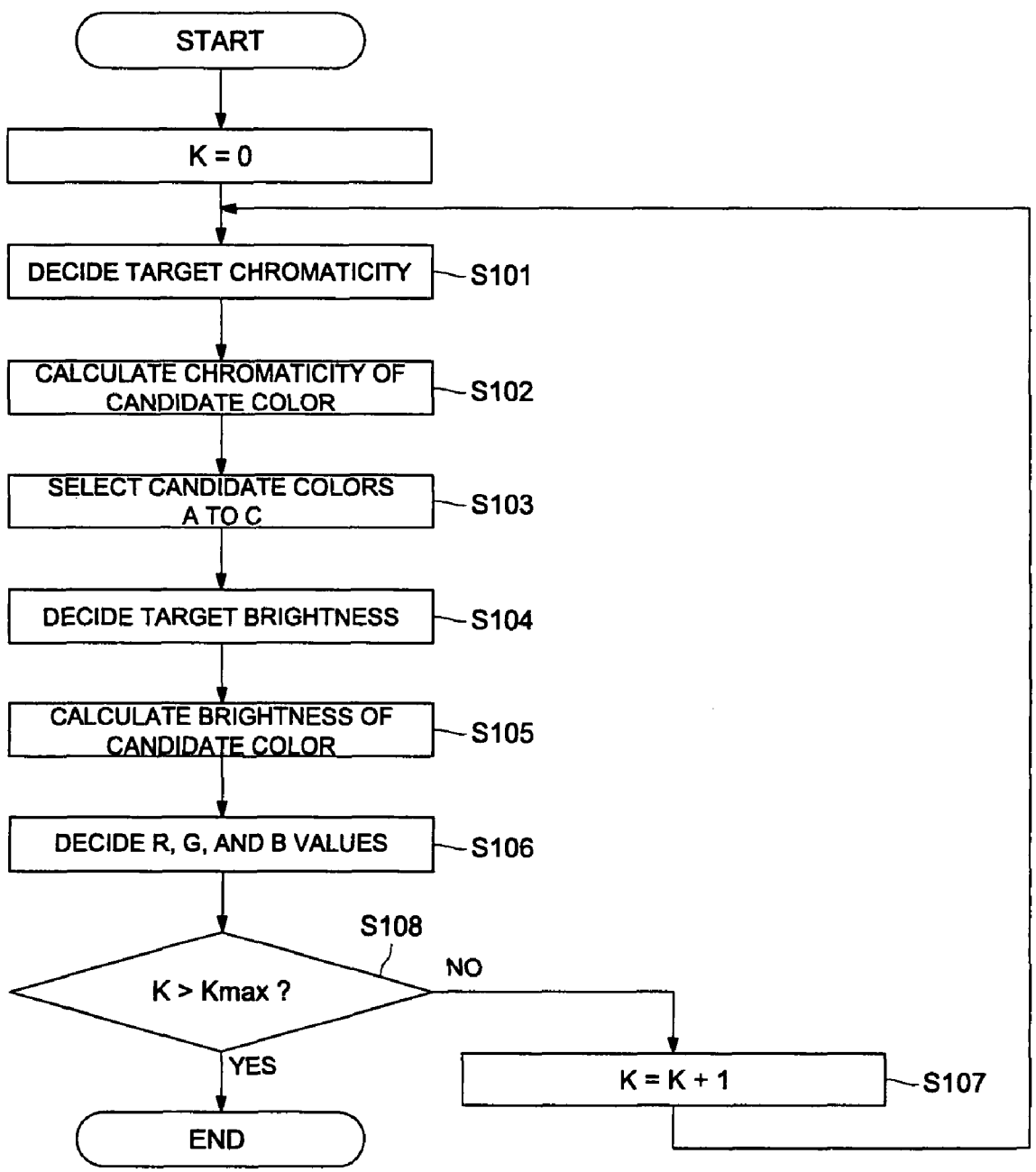
FIG. 17 is a flowchart showing operations for selecting R, G and B values in a second embodiment of the present invention.

The second embodiment of selection of the R, G, and B values at Step S33 shown in FIG. 7 will be explained by referring to the flow chart shown in FIG. 17. In the flow chart shown in FIG. 17, the respect that the selection by luminance is carried out following the primary selection by chromaticity is different from the first embodiment. Hereinafter, the process different from the first embodiment will be explained.

Firstly, the chromaticity calculation unit 65 decides a target chromacity C (k) for the internal signal value k (Step S101, the chromaticity decision process). For the target chromaticity C (k), the estimated measured chromaticity which is stored beforehand in correspondence with the internal signal value k is used.

Figure 7:
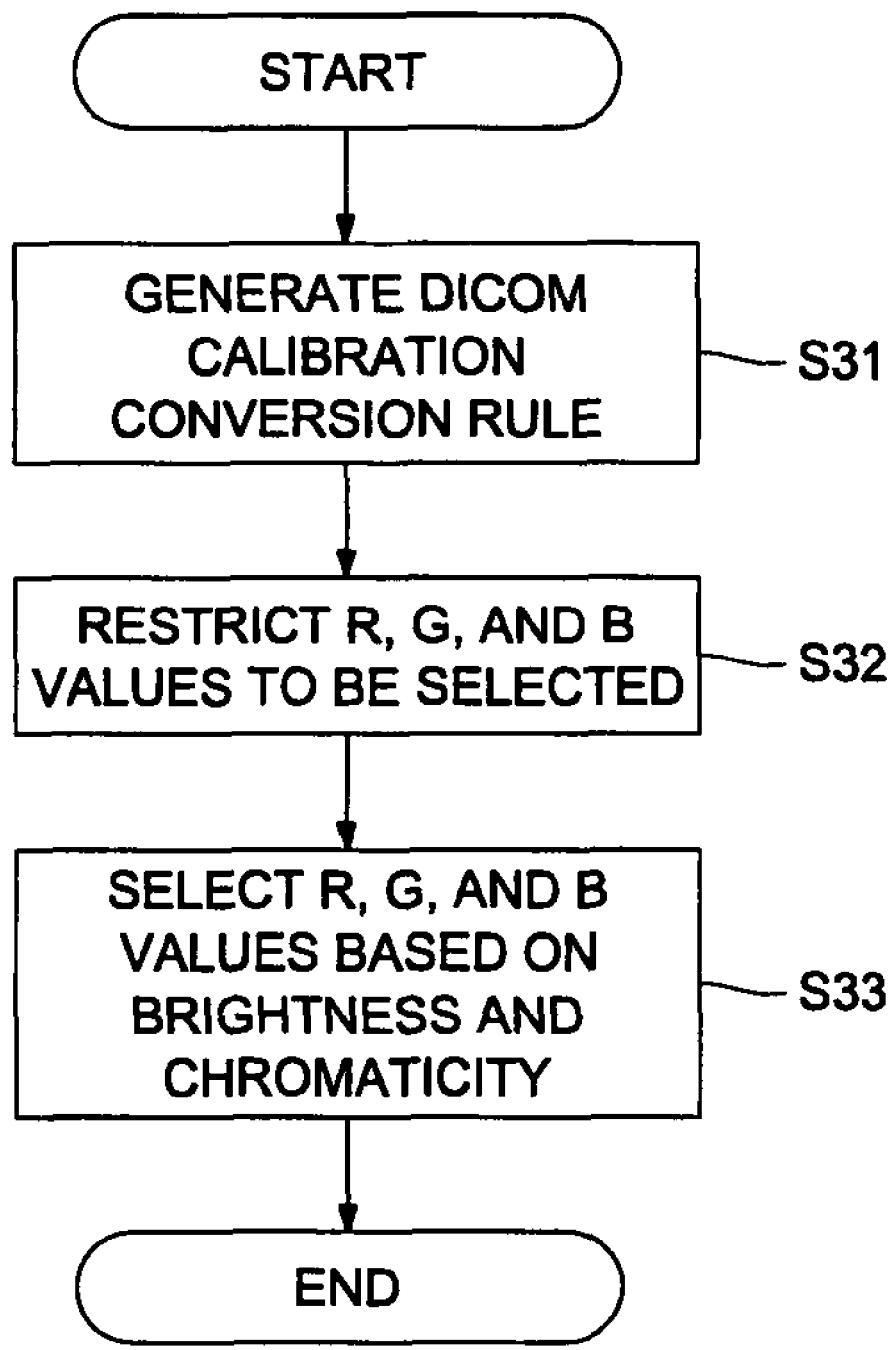
FIG. 7 is a flowchart showing a conversion rule derivation process in a first embodiment of the present invention.

The chromaticity calculation unit 65, for each of the candidate colors restricted at Step S32 shown in FIG. 7, calculates the color irritant values X, Y, and Z using the RGB-XYZ estimation formula of the general Formula (1) aforementioned and on the basis of the calculated color irritant values, obtains the chromaticity using the general Formulas (2) to (4) aforementioned (Step S102, the chromaticity calculation process).

And, the signal value decision unit 67 selects primarily N candidate colors A to C (the primary candidate R, G, and B display image data) starting from the closest one to the target chromaticity C (k) (Step S103, the chromaticity selection process).

Next, the target luminance decision unit 64 assumes the luminance of the R, G, and B values selected for the internal signal value k−1 of the monochromatic image data added with a predetermined value as a target luminance (Step S104, the luminance decision process). On the other hand, the luminance calculation unit 66 calculates the luminance Y of each of the candidate colors A to C using the general Formula (1) aforementioned (Step S105, the luminance calculation process). And, the signal value decision unit 67, among the candidate colors A to C, assumes a color having luminance closest to the target luminance Y (k) within the range not exceeding the target luminance Y (k) as a selection color (Step S106, the luminance selection process).

The LUT generation unit 13 assumes the R, G, and B values selected in this way as R, G, and B values of the internal signal value k (the signal values of the color display image data). Then, the LUT generation unit 13, also for the internal signal value k+1, selects similarly the R, G, and B values (Step S107, NO at Step S108), selects the R, G, and B values for all the internal signal values of 4096 grayscales, and finishes the generation of the LUT (YES at Step S108).

As mentioned above, according to the image display apparatus 1 relating to this embodiment, from among the candidate colors of the respective internal signal values, the color close to the preferable chromaticity is selected primarily, and then one selection color is selected on the basis of luminance, thus an LUT can be generated or corrected, and an LUT reflecting the display characteristic of the liquid crystal panel 2 can be used. Further, a selection color may be selected from among a plurality of candidate colors for the internal signal value, so that the choices of combination of R, G, and B values for one internal signal value can be increased. Therefore, a multi-grayscale display exceeding the grayscale characteristic of the liquid crystal panel 2 is available, and an image of a high grayscale resolution can be represented.

Embodiment

Uniform images corresponding to 0 to 4095 input grayscales are prepared and the conversion process is performed using the LUT prepared by the first embodiment relating to the present invention. Those images are displayed by adjusting the 3-mega-pixel color liquid crystal monitor (FA-2090) by Eizo Nanao Corporation to $\gamma=2.2$ and the chromaticity is measured at a view field angle of 2° using the luminance meter (LS-1000) by Konica Minolta Sensing, Inc.

Figure 18:
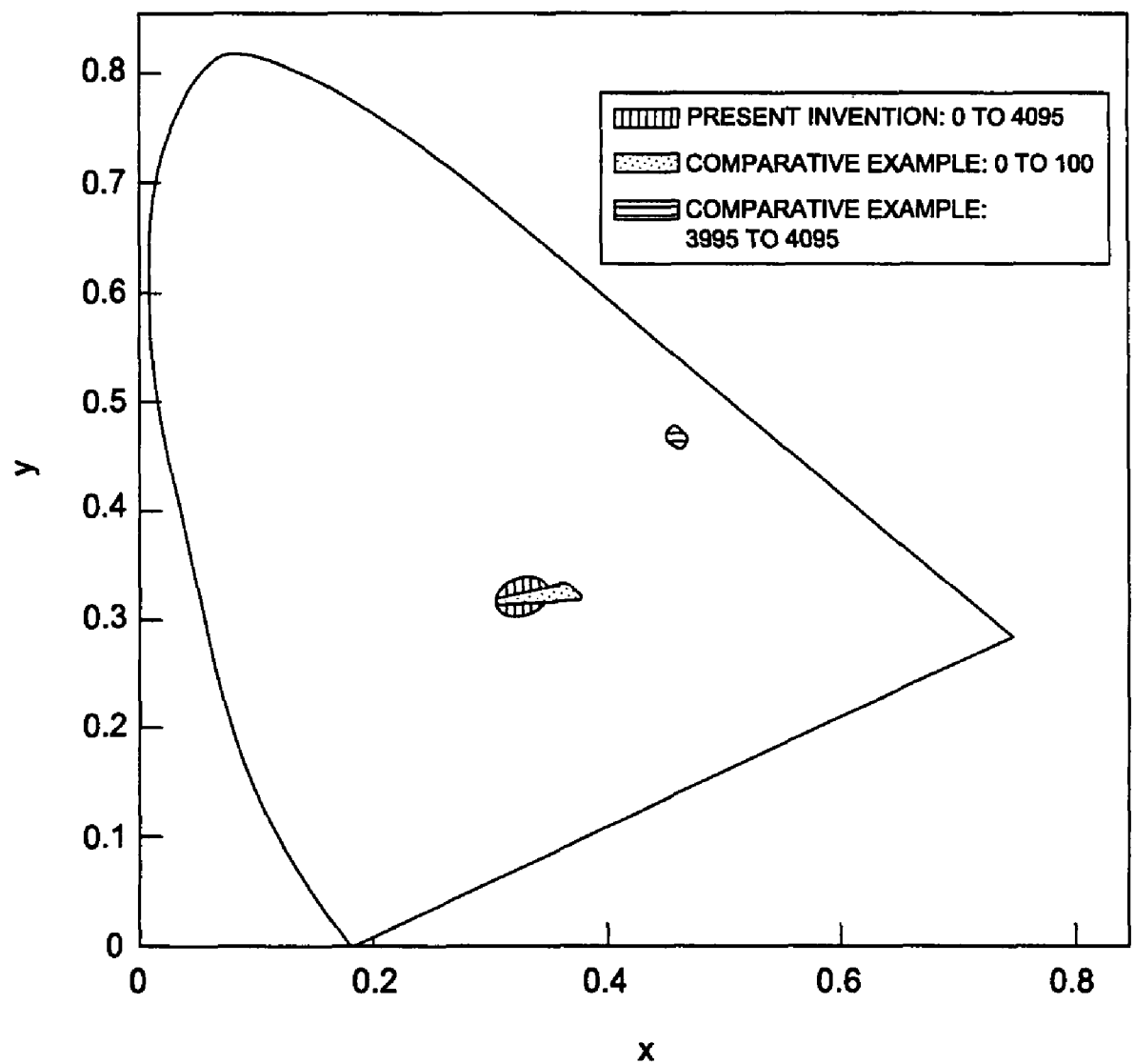
FIG. 18 is a CIE xy chromaticity diagram showing measuring results in an embodiment of the present invention.

The results of the measured chromaticity are shown in FIG. 18. FIG. 18 is a CIE xy chromaticity diagram. It is found that for the 0 to 4095 input grayscales, the chromaticity is always within the chromaticity range suited to the monochromatic image.

On the other hand, the change process is performed for images using the LUT (only the first 0 to 100 input grayscales and last 3995 to 4095 input grayscales) of Patent Document 3 shown in FIG. 3, and γ of the liquid crystal monitor is adjusted to 3.177, and images are displayed, thus the chromaticity is measured. The results show that for the 0 to 100 input grayscales, in correspondence with an increase in the input grayscale, the chromaticity is changed. Furthermore, the chromaticity for the 3995 to 4095 input grayscales is separated greatly from the area of the monochromatic image and is seen almost yellow. The reason is that for the LUT of Patent Document 3 shown in FIG. 3, a multi-grayscale display on a monochromatic monitor is supposed, so that the selectable range of a sub-pixel signal value is large excessively and under only the condition concerning luminance, the sub-pixel value is selected.

As mentioned above, the present invention, on the basis of not only the luminance information but also both luminance information and chromaticity information, decides R, G, and B data and generates an LUT, so that the present invention can display an image of an appropriate chromaticity as a monochromatic image and can represent a multi-grayscale 2 bits (4 times) or more long than the number of drive grayscales of the display free of an FRC display.

According to the present invention, since each combination of R, G and B signal values of color display image data, corresponding to each signal values of the monochromatic image data, is determined, based on the luminance information and the chromaticity information corresponding to each signal value of the monochromatic image data, it becomes possible to establish correlations for displaying a medical image having a sufficient grayscale reproducibility and a color tone, which are indispensable for the medical image diagnosis. In other words, even when a low-cost color image display apparatus, having a relatively small number of drive grayscales, is employed, it becomes possible to display a medical image having the sufficient grayscale reproducibility and the color tone, with respect to the high-resolution monochromatic image data having a number of gradations, which is equal to or greater than four times of the number of drive grayscales of the color display apparatus, without employing any kind of time sharing display mode.

While the preferred embodiments of the present invention have been described using specific term, such description is for illustrative purpose only, and it is to be understood that changes and variations may be made without departing from the spirit and scope of the appended claims.

What is claimed is:

1. A control method of controlling an image processing apparatus, for converting (n+m)-bit monochromatic image data represented by a single channel into n-bit color display image data represented by at least three channels, based on predetermined correlations between the (n+m)-bit monochromatic image data and the n-bit color display image data, wherein numeral "n" indicates a positive integer not less than 8, and numeral "m" indicates a positive integer not less than 2, the control method comprising: operating the image processing apparatus to perform:
   acquiring luminance information corresponding to each of monochrome signal values represented by the (n+m)-bit monochromatic image data;
   acquiring chromaticity information corresponding to each of the monochrome signal values represented by the (n+m)-bit monochromatic image data;
   determining each combination of plural-channel color signal values represented by the n-bit color display image data, based on the luminance information and the chromaticity information, so that each combination of the plural-channel color signal values corresponds to each of the monochrome signal values;
   establishing the predetermined correlations between the (n+m)-bit monochromatic image data and the n-bit color display image data, so that each combination of the plural-channel color signal values and each of the monochrome signal values are correlated with each other;
   selecting a plurality of candidate color display image data having signal values different from each other, with respect to each of the monochrome signal values represented by the (n+m)-bit monochromatic image data; and
   calculating a luminance and a chromaticity with respect to each of the plurality of candidate color display image data;
   wherein said acquiring of luminance information includes:
      a luminance determining process for determining a target luminance corresponding to each of the monochrome signal values represented by the (n+m)-bit monochromatic image data;
   wherein said acquiring of chromaticity information includes:
      a chromaticity determining process for determining a target chromaticity corresponding to each of the monochrome signal values represented by the (n+m)-bit monochromatic image data; and
   wherein, in said determining, signal values of color display image data are determined, based on a contrast between each luminance of the plurality of candidate color display image data calculated in said calculating and the target luminance, and another contrast between each chromaticity of the plurality of candidate color display image data calculated in said calculating and the target chromaticity.

2. The control method of claim 1,
wherein said determining includes:
   a luminance selection process for selecting a plurality of primary-candidate color display image data, based on the contrast between each luminance of the plurality of candidate color display image data and the target luminance; and
   a chromaticity selection process for determining signal values of the specific color display image data, based on a contrast between each chromaticity of the plurality of primary-candidate color display image data and the target chromaticity.

3. The control method of claim 2,
wherein, in the chromaticity determining process, a target chromaticity, corresponding to a certain monochrome signal value of the (n+m)-bit monochromatic image data, is set at a chromaticity, determined in said determining and corresponding to another monochrome signal value of the (n+m)-bit monochromatic image data; and
wherein, in the chromaticity selection process, signal values of color display image data are determined, based on a contrast between the chromaticity calculated in said calculating, with respect to each of the primary-candidate color display image data corresponding to a certain monochrome signal value of the (n+m)-bit monochromatic image data, and the target chromaticity.

4. The control method of claim 3,
wherein, in the chromaticity determining process, the target chromaticity, corresponding to signal value "i" of the (n+m)-bit monochromatic image data, is employed as a chromaticity of color display image data, which corresponds to (n+m)-bit monochromatic image data of signal value (i−1), wherein "i" indicates a positive integer not less than 1 and not greater than ($2^{n+m}-1$); and
wherein, in the chromaticity selection process, signal values of primary-candidate color display image data, which have such a chromaticity that is calculated in said calculating and makes a color-difference with the target chromaticity minimum, is selected from the plurality of primary-candidate color display image data corresponding to the (n+m)-bit monochromatic image data of the signal value "i".

5. The control method of claim 3,
wherein, in the chromaticity determining process, the target chromaticity, corresponding to signal value "i" of the (n+m)-bit monochromatic image data, is employed as a chromaticity of color display image data, which corresponds to (n+m)-bit monochromatic image data of signal value (i−1) and another chromaticity of the color display image data, which corresponds to (n+m)-bit monochromatic image data of signal value (i−2), wherein "i" indicates a positive integer not less than 2 and not greater than ($2^{n+m}-1$); and wherein, in the chromaticity selection process, primary-candidate color display image data, which have such a chromaticity that is calculated in the calculating step and makes an absolute difference value between color-difference ΔE(i−1) and color-difference ΔE(i−2) maximum, is selected from the plurality of primary-candidate color display image data corresponding to the (n+m)-bit monochromatic image data of the signal value "i"; and wherein the color-difference ΔE(i−1) is defined as a color-difference with color display image data, which corresponds to (n+m)-bit monochromatic image data of signal value (i−1), and the color-difference ΔE(i−2) is defined as a color-difference with color display image data, which corresponds to (n+m)-bit monochromatic image data of signal value (i−2).

6. The control method of claim 1,
wherein said determining includes:
a chromaticity selection process for selecting a plurality of primary-candidate color display image data, based on a contrast between each chromaticity of the plurality of candidate color display image data calculated in said calculating and the target chromaticity; and
a luminance selection process for determining a signal value of color display image data, based on a contrast between each luminance of the plurality of primary-candidate color display image data and the target luminance.

7. An image processing apparatus which converts (n+m)-bit monochromatic image data represented by a single channel into n-bit color display image data represented by at least three channels, based on predetermined correlations between the (n+m)-bit monochromatic image data and the n-bit color display image data, wherein numeral "n" indicates a positive integer not less than 8, and numeral "m" indicates a positive integer not less than 2, the image processing apparatus comprising:
a luminance calculating section to calculate luminance information corresponding to each of monochrome signal values represented by the (n+m)-bit monochromatic image data;
a chromaticity calculating section to calculate chromaticity information corresponding to each of the monochrome signal values represented by the (n+m)-bit monochromatic image data;
a signal value determining section to determine each combination of plural-channel color signal values represented by the n-bit color display image data, based on the luminance information and the chromaticity information, so that each combination of the plural-channel color signal values corresponds to each of the monochrome signal values;
a correlation establishing section to establish the predetermined correlations between the (n+m)-bit monochromatic image data and the n-bit color display image data, so that each combination of the plural-channel color signal values and each of the monochrome signal values are correlated with each other;
a candidate-data selecting section to select a plurality of candidate color display image data having signal values different from each other, with respect to each of the monochrome signal values represented by the (n+m)-bit monochromatic image data;
a target luminance determining section to determine a target luminance corresponding to each of the monochrome signal values represented by the (n+m)-bit monochromatic image data; and
a target chromaticity determining section to determine a target chromaticity corresponding to each of the monochrome signal values represented by the (n+m)-bit monochromatic image data;
wherein the luminance calculating section calculates a luminance with respect to each of the plurality of candidate color display image data, and the chromaticity calculating section calculates a chromaticity with respect to each of the plurality of candidate color display image data; and
wherein the signal value determining section selects specific color display image data, based on a contrast between each luminance of the plurality of candidate color display image data and the target luminance, and another contrast between each chromaticity of the plurality of candidate color display image data and the target chromaticity.

8. The image processing apparatus of claim 7,
wherein the signal value determining section includes:
a luminance selection unit to selects a plurality of primary-candidate color display image data, based on the contrast between each luminance of the plurality of candidate color display image data and the target luminance; and
a chromaticity selection unit to determine signal values of the specific color display image data, based on a contrast between each chromaticity of the plurality of primary-candidate color display image data and the target chromaticity.

9. The image processing apparatus of claim 8,
wherein the target chromaticity determining section sets a target chromaticity, corresponding to a certain monochrome signal value of the (n+m)-bit monochromatic image data, at a chromaticity, determined by the signal value determining section and corresponding to another monochrome signal value of the (n+m)-bit monochromatic image data; and
wherein the chromaticity selection unit determines signal values of the specific color display image data, based on a contrast between the chromaticity, with respect to each of the primary-candidate color display image data corresponding to a certain monochrome signal value of the (n+m)-bit monochromatic image data, and the target chromaticity.

10. The image processing apparatus of claim 9,
wherein the target chromaticity determining section employs the target chromaticity, corresponding to signal value "i" of the (n+m)-bit monochromatic image data, as a chromaticity of color display image data, which corresponds to (n+m)-bit monochromatic image data of signal value (i−1), wherein "i" indicates a positive integer not less than 1 and not greater than ($2^{n+m}-1$); and
wherein the chromaticity selection unit selects signal values of primary-candidate color display image data, which have such a chromaticity that makes a color-difference with the target chromaticity minimum, from the plurality of primary-candidate color display image data corresponding to the (n+m)-bit monochromatic image data of the signal value "i".

11. The image processing apparatus of claim 9,
wherein the target chromaticity determining section employs the target chromaticity, corresponding to signal value "i" of the (n+m)-bit monochromatic image data, as a chromaticity of color display image data, which corresponds to (n+m)-bit monochromatic image data of signal value (i−1) and another chromaticity of the color display image data, which corresponds to (n+m)-bit monochromatic image data of signal value (i−2), wherein "i" indicates a positive integer not less than 2 and not greater than ($2^{n+m}$−1); and wherein the chromaticity selection unit selects primary-candidate color display image data, which have such a chromaticity that is calculated in the calculating step and makes an absolute difference value between color-difference ΔE(i−1) and color-difference ΔE(i−2) maximum, from the plurality of primary-candidate color display image data corresponding to the (n+m)-bit monochromatic image data of the signal value "i"; and wherein the color-difference ΔE(i−1) is defined as a color-difference with color display image data, which corresponds to (n+m)-bit monochromatic image data of signal value (i−1), while, the color-difference ΔE(i−2) is defined as a color-difference with color display image data, which corresponds to (n+m)-bit monochromatic image data of signal value (i−2).

12. The image processing apparatus of claim 7, wherein the signal value determining section includes:

a chromaticity selection unit to selects a plurality of primary-candidate color display image data, based on the contrast between each chromaticity of the plurality of candidate color display image data and the target chromaticity; and a luminance selection unit to determine signal values of the specific color display image data, based on a contrast between each luminance of the plurality of primary-candidate color display image data and the target luminance.

* * * * *